United States Patent
Chae et al.

(10) Patent No.: US 11,650,397 B2
(45) Date of Patent: May 16, 2023

(54) IMAGING LENS SYSTEM

(71) Applicant: Samsung Electro-Mechanics Co., Ltd., Suwon-si (KR)

(72) Inventors: Kyu Min Chae, Suwon-si (KR); Hyo Jin Hwang, Suwon-si (KR); Hwan Soo Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 446 days.

(21) Appl. No.: 16/786,151

(22) Filed: Feb. 10, 2020

(65) Prior Publication Data
US 2021/0072509 A1   Mar. 11, 2021

(30) Foreign Application Priority Data
Sep. 9, 2019 (KR) .......................... 10-2019-0111393

(51) Int. Cl.
*G02B 9/64* (2006.01)
*G02B 9/04* (2006.01)
*G02B 13/00* (2006.01)

(52) U.S. Cl.
CPC ................. *G02B 9/64* (2013.01); *G02B 9/04* (2013.01); *G02B 13/0045* (2013.01)

(58) Field of Classification Search
None
See application file for complete search history.

(56) References Cited

U.S. PATENT DOCUMENTS

| | | | | |
|---|---|---|---|---|
| 5,054,897 A * | 10/1991 | Ozawa | ................. | G02B 15/177 359/708 |
| 6,081,384 A * | 6/2000 | Mori | ................. | G02B 27/0025 359/637 |
| 10,131,278 B2 | 11/2018 | Nagano | | |
| 2002/0048080 A1* | 4/2002 | Nagatoshi | .............. | G02B 13/16 359/356 |
| 2007/0070495 A1 | 3/2007 | Hirose | | |
| 2007/0217030 A1* | 9/2007 | Muramatsu | ........... | G02B 13/16 359/708 |
| 2013/0094095 A1* | 4/2013 | Minefuji | ................ | G02B 13/16 359/680 |
| 2016/0131874 A1* | 5/2016 | Tang | ........................ | G02B 9/64 359/708 |

(Continued)

FOREIGN PATENT DOCUMENTS

| | | |
|---|---|---|
| CN | 104898258 A | 9/2015 |
| CN | 110095854 A | 8/2019 |

(Continued)

OTHER PUBLICATIONS

Kasarova et al, 2010, J. Phys.: Conf. Ser. 253 012028.*
Grey, "Athermalization of Optical Systems," Journal of the Optical Society of America, Jun. 1948, vol. 38, No. 6, pp. 542-546.

(Continued)

*Primary Examiner* — Darryl J Collins
(74) *Attorney, Agent, or Firm* — NSIP Law

(57) ABSTRACT

An imaging lens system includes a first lens, a second lens, a third lens, a fourth lens, a fifth lens, a sixth lens, and a seventh lens disposed in order from an object side, and a stop disposed on an image side of one of the first to sixth lenses, and one or more of the second to seventh lenses, disposed on an image side of the stop, each has a positive refractive power and a negative refractive index temperature coefficient.

16 Claims, 18 Drawing Sheets

(56) References Cited

U.S. PATENT DOCUMENTS

| | | | |
|---|---|---|---|
| 2016/0170180 A1* | 6/2016 | Son .................... | G02B 13/0045 359/708 |
| 2018/0213151 A1 | 7/2018 | Joujiki et al. | |
| 2018/0275379 A1 | 9/2018 | Cheng et al. | |
| 2019/0235196 A1 | 8/2019 | Hong et al. | |
| 2019/0235210 A1 | 8/2019 | Nakai et al. | |
| 2021/0333510 A1* | 10/2021 | Wei ....................... | G02B 13/06 |

FOREIGN PATENT DOCUMENTS

| | | |
|---|---|---|
| CN | 110456475 A | 11/2019 |
| CN | 111198430 A | 5/2020 |
| CN | 112346208 A | 2/2021 |
| JP | 2014-102291 A | 6/2014 |
| JP | 2018-120124 A | 8/2018 |
| KR | 10-2013-0100890 A | 9/2013 |
| TW | 201835630 A | 10/2018 |
| WO | WO 2011/127356 A2 | 10/2011 |

OTHER PUBLICATIONS

Taiwanese Office Action dated Nov. 5, 2020 issued in the corresponding Taiwanese Patent Application No. 109105233 (4 pages in English)(4 pages in Taiwanese).

Chinese Office Action dated Apr. 18, 2022, in counterpart Chinese Patent Application No. 202010337497.1 (8 pages in English and 10 pages in Chinese).

Chinese Office Action dated Sep. 22, 2022, in counterpart Chinese Patent Application No. 202010337497.1 (5 pages in English and 6 pages in Chinese).

\* cited by examiner

IMAGING LENS SYSTEM

CROSS-REFERENCE TO RELATED APPLICATION(S)

This application claims the benefit under 35 USC 119(a) of Korean Patent Application No. 10-2019-0111393 filed on Sep. 9, 2019 in the Korean Intellectual Property Office, the entire disclosure of which is incorporated herein by reference for all purposes.

BACKGROUND

1. Field

The following description relates to an imaging lens system which may implement a constant optical performance regardless of changes in ambient temperature.

2. Description of Background

A small-sized surveillance camera is configured to obtain image information from a surveillance area. For example, a small-sized surveillance camera may be mounted on front and rear bumpers of a vehicle and may provide obtained images to a driver.

As early model small-sized surveillance cameras were configured to image an obstacle near a vehicle, early model small-sized surveillance cameras had relatively low resolution, and resolution may change depending on temperature changes between −40 and 80° C. More recently, a vehicle has been required to have a self-driving function, and there has been demand for a surveillance camera which has high resolution and may implement constant optical properties under harsh temperature conditions.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An imaging lens system which may implement constant optical properties regardless of an ambient temperature.

In one general aspect, an imaging lens system includes a first lens, a second lens, a third lens, a fourth lens, a fifth lens, a sixth lens, and a seventh lens disposed in order from an object side, and a stop disposed on an image side of one of the first to sixth lenses, and one or more of the second to seventh lenses, disposed on an image side of the stop, each has a positive refractive power and a negative refractive index temperature coefficient.

The stop may be disposed between the third lens and the fourth lens.

The fourth lens or the sixth lens may have positive refractive power.

The fourth lens or the sixth lens may have a negative refractive index temperature coefficient.

A refractive index temperature coefficient of the fourth lens or the sixth lens may be greater than $-10*10^{-6}/°$ C. and less than $-0.5*10^{-6}/°$ C.

The second lens may have a concave object-side surface.

The sixth lens may have a convex image-side surface.

The seventh lens may have negative refractive power.

The seventh lens may have a concave object-side surface.

In another general aspect, an imaging system includes a first lens group disposed on an object-side surface of a stop; and a second lens group disposed between the stop and an image-side surface. A sum, DTnT, of refractive index temperature coefficients of lenses included in the first lens group and lenses included in the second lens group is $-3.5$ [$10^{-6}/°$ C.] or greater and $3.5$ [$10^{-6}/°$ C.] or less.

A sum, DTnF, of refractive index temperature coefficients of the lenses included in the first lens group may be $5.0$ [$10^{-6}/°$ C.] or greater and $15$ [$10^{-6}/°$ C.] or less.

A sum, DTnR, of refractive index temperature coefficients of the lenses included in the second lens may be $-20$ [$10^{-6}/°$ C.] or greater and $-8.0$ [$10^{-6}/°$ C.] or less.

The sum, DTnF, of refractive index temperature coefficients of the lenses included in the first lens group and the sum, DTnR, of refractive index temperature coefficients of the lenses included in the second lens group may satisfy $0.8 \leq |DTnF/DTnR| \leq 1.2$.

Among the lenses included in the first lens group, a lens most adjacent to the stop may have positive refractive power.

Among the lenses included in the second lens group, a lens most adjacent to the stop may have positive refractive power.

Among the lenses included in the second lens group, a lens most adjacent to the image-side surface may have negative refractive power.

In another general aspect, an imaging lens system includes a stop; a first lens group disposed on an object side of the stop and including two or more lenses, two or more the lenses of the first lens group each having a positive refractive index temperature coefficient; and a second lens group disposed between an image side of the stop and an image sensor, and including two or more lenses, two or more lenses of the second lens group each having a negative refractive index temperature coefficient.

The first lens group may include three lenses and the second lens group may include four lenses.

A lens of the second group disposed most adjacent to the stop may have a positive refractive index temperature coefficient.

At least two of the lenses of the first lens group may each have negative refractive power, and at least two of the lenses of the second lens group may each have negative refractive power.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
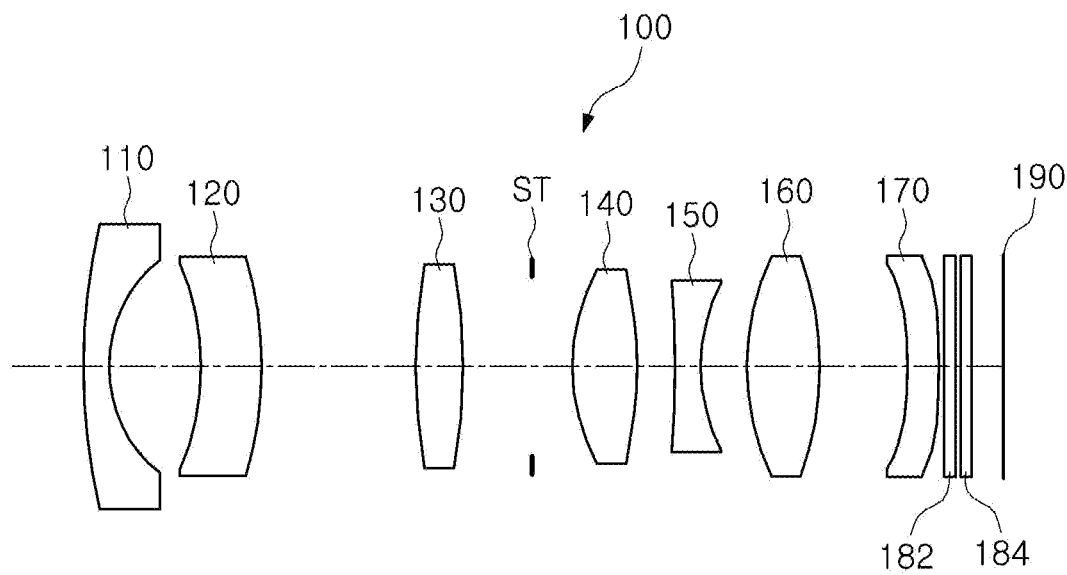
FIG. 1 is a diagram illustrating a first example of an imaging lens system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the examples, a first lens refers to a lens most adjacent to an object, and a seventh lens refers to a lens most adjacent to an image-side surface (or an image sensor). In the examples, a unit of a radius of curvature, a thickness, a distance from an object-side surface to an image-side surface of a first lens (TTL), a half of a diagonal length of an image-side surface (IMG HT), and a focal length are indicated in millimeters (mm).

A thickness of a lens, a gap between lenses, and a TTL refer to a distance of a lens taken in an optical axis direction. Also, in the descriptions of a shape of a lens, a configuration in which one surface is convex indicates that a paraxial region of the surface is convex, and a configuration in which one surface is concave indicates that a paraxial region of the surface is concave. Thus, even when one surface of a lens is described as being convex, an edge of the lens may be concave. Similarly, even when one surface of a lens is described as being concave, an edge of the lens may be convex.

The imaging lens system includes seven lenses. For example, the imaging lens system may include a first lens, a second lens, a third lens, a fourth lens, a fifth lens, a sixth lens, and a seventh lens disposed in order from an object-side surface. The first to seventh lenses may be disposed with a certain gap between each of the adjacent lenses. For example, image-side surfaces and object-side surfaces of adjacent lenses may not be in contact with each other in a paraxial region. Thus, even when an image-side surface of a lens on one side and an object-side surface of a lens on the other surface are illustrated as being in contact with each other in the drawings, the image-side surface and the object-side surface are not in contact with each other between the two lenses.

A first lens has refractive power. For example, the first lens has negative refractive power. One surface of the first lens may be convex. For example, an object-side surface of the first lens may be convex.

The first lens includes a spherical surface. For example, both surfaces of the first lens may be spherical. The first lens may be manufactured using a material having high light transmissivity and excellent workability. For example, the first lens may be manufactured using glass or a plastic material. The first lens has a high refractive index. For example, a refractive index of the first lens may be 1.7 or greater. As another example, a refractive index of the first lens may be 1.7 or greater and 1.8 or less.

The second lens has refractive power. For example, the second lens may have negative refractive power. One surface of the second lens may be concave. For example, an object-side surface or an image-side surface of the second lens may be concave.

The second lens may include a spherical surface. For example, both surfaces of the second lens may be spherical. The second lens may be manufactured using a material having high light transmissivity and excellent workability. For example, the second lens may be manufactured using glass or a plastic material. The second lens may have a refractive index greater than the refractive index of the first lens. For example, a refractive index of the second lens may be 1.8 or greater. As another example, a refractive index of the second lens may be 1.8 or greater and less than 2.0.

The third lens may have refractive power. For example, the third lens may have positive refractive power. One surface of the third lens may be convex. For example, an object-side surface of the third lens may be convex.

The third lens may include a spherical shape. For example, both surfaces of the third lens may be spherical. The third lens may be manufactured using a material having high light transmissivity and excellent workability. For example, the third lens may be manufactured using glass or a plastic material. The third lens may have a refractive index similar to the refractive index of the second lens. For example, a refractive index of the third lens may be 1.8 or greater. As another example, a refractive index of the third lens may be 1.8 or greater and less than 2.0.

The fourth lens may have refractive power. For example, the fourth lens may have positive refractive power. One surface of the fourth lens may be convex. For example, an object-side surface of the fourth lens may be convex.

The fourth lens may include an aspherical surface. For example, both surfaces of the fourth lens may be aspherical. The fourth lens may be manufactured using a material having high light transmissivity and excellent workability. For example, the fourth lens may be manufactured using glass or a plastic material. The fourth lens may have the lowest refractive index among the first to seventh lenses. As an example, a refractive index of the fourth lens may be less than 1.6. As another example, a refractive index of the fourth lens may be 1.2 or greater and less than 1.6.

The fifth lens may have refractive power. The fifth lens may have negative refractive power. One surface of the fifth lens may be concave. For example, an object-side surface of the fifth lens may be concave.

The fifth lens may include a spherical shape. For example, both surfaces of the fifth lens may be spherical. The fifth lens may be manufactured using a material having high light transmissivity and excellent workability. For example, the fifth lens may be manufactured using glass or a plastic material. The fifth lens may have a refractive index similar to the refractive index of the third lens. For example, a refractive index of the fifth lens may be 1.8 or greater. As another example, a refractive index of the fifth lens may be 1.8 or greater and less than 2.0.

The sixth lens may have refractive power. For example, the sixth lens may have positive refractive power. One surface of the sixth lens may be convex. For example, an image-side surface of the sixth lens may be convex.

The sixth lens may include a spherical surface. For example, both surfaces of the sixth lenses may be spherical. The sixth lens may be manufactured using a material having high light transmissivity and excellent workability. For example, the sixth lens may be manufactured using glass or a plastic material. The sixth lens may have a refractive index similar to the refractive index of the fourth lens. For example, a refractive index of the sixth lens may be 1.5 or greater and less than 1.7.

The seventh lens may have refractive power. For example, the seventh lens may have negative refractive power. At least one surface of the seventh lens may be concave. For example, an object-side surface of the seventh lens may be concave.

The seventh lens may include an aspherical shape. For example, both surfaces of the seventh lens may be aspherical. The seventh lens may be manufactured using a material having high light transmissivity and excellent workability. For example, the seventh lens may be manufactured using glass or a plastic material. The seventh lens may have a refractive index similar to the refractive index of the first lens. For example, a refractive index of the seventh lens may be 1.7 or greater. As another example, a refractive index of the seventh lens may be 1.7 or greater and less than 1.9.

The fourth and seventh lenses may include aspherical surfaces as described above. The aspherical surfaces of the fourth and seventh lenses may be represented by Equation 1 below.

$$Z = \frac{cr^2}{1+\sqrt{1-(1+k)c^2r^2}} + Ar^4 + Br^6 + Cr^8 + Dr^{10} \quad \text{Equation 1}$$

In Equation 1, "c" is an inverse of a radius of a curvature of a respective lens, "k" is a conic constant, "r" is a distance from a certain point on an aspherical surface of the lens to an optical axis, "A", "B", "C", and "D" are aspheric constants, "Z" (or SAG) is a height from a certain point on an aspherical surface of the lens to an apex of the aspherical surface taken in an optical axis direction.

The imaging lens system may include a filter, an image sensor, and a stop. The imaging lens system may further include a cover glass.

The filter may be disposed between the seventh lens and the image sensor. The filter may block light having a certain wavelength. For example, the filter may block light having infrared wavelength. The image sensor may form an image-side surface. The stop may be configured to adjust an amount of light incident to the lenses. For example, the stop may be disposed between the third lens and the fourth lens. The cover glass may be disposed between the filter and the image sensor and may prevent contamination and damage of the image sensor caused by foreign objects.

Each of the first lens to the seventh lens may have a certain refractive index temperature coefficient ($10^{-6}/°$ C.). Refractive index temperature coefficients (DTn) of the lenses may be distinguished from one another by the stop disposed therebetween. As an example, most of the lenses (first lens group) disposed on an object-side surface of the stop may have a positive refractive index temperature coefficient, whereas most of the lenses (second lens group) disposed between the stop and an image-side surface may have a negative refractive index temperature coefficient. However, not all the lenses included in the second lens group may have a negative refractive index temperature coefficient. As an example, among the lenses included in the second lens group, a lens disposed most adjacent to an object-side surface may have a positive refractive index temperature coefficient.

The lenses having positive refractive power among the lenses included in the second lens group may have a negative refractive index temperature coefficient. For example, the fourth lens or the sixth lens of the lenses included in the second lens group may have positive refractive power and may have a negative refractive index temperature coefficient.

The lenses included in each of the lens groups may have certain refractive power in a certain position. As an example, among the lenses included in the first lens group, a lens most adjacent to the stop may have positive refractive power. As another example, among the lenses included in the second lens group, a lens most adjacent to the stop may have positive refractive power. As another example, among the lenses included in the second lens group, a lens most adjacent to an image-side surface may have negative refractive power.

The lenses included in the imaging lens system may satisfy one or more of conditional equations below with respect to a refractive index temperature coefficient (hereinafter, referred to as "DTn").

| | |
|---|---|
| $-3.5 \leq DTnT \leq 3.5[10^{-6}/°$ C.] | Conditional Equation 1 |
| $5.0 \leq DTnF \leq 15[10^{-6}/°$ C.] | Conditional Equation 2 |
| $-20 \leq DTnR \leq -8.0[10^{-6}/°$ C.] | Conditional Equation 3 |
| $0.8 \leq |DTnF/DTnR| \leq 1.2[10^{-6}/°$ C.] | Conditional Equation 4 |

In the conditional equations 1-4, "DTnT" is a sum of DTns of the lenses included in the imaging lens system, "DTnF" is a sum of DTns of the lenses (first lens group) disposed on an object side of the stop, and "DTnR" is a sum of DTns of the lenses (second lens group) disposed between the stop and an image side.

DTns of the lenses included in the second lens group may have a certain range. As an example, a refractive index temperature coefficient (DTn4) of the fourth lens or a refractive index temperature coefficient (DTn6) of the sixth lens may be greater than $-10*10^{-6}/°$ C. and less than $-0.5*10^{-6}/°$ C.

The lenses included in the imaging lens system may have a certain constant of thermal expansion ($10^{-6}/°$ C.). For example, constant of thermal expansions (CTE) of the first lens to the seventh lens may be 2.0 [$10^{-6}/°$ C.] or greater and 20 [$10^{-6}/°$ C.] or less. At least one of the lenses included in the imaging lens system may have a constant of thermal expansion different from constant of thermal expansions of the other lenses. As an example, a constant of thermal expansion (CTE6) of the sixth lens may be greater than constant of thermal expansions (CTE1, CTE2, CTE3, CTE4, CTE5, and CTE7) of the other lenses. As another example, a constant of thermal expansion (CTE7) of the seventh lens may be less than a constant of thermal expansion (CTE6) of the sixth lens.

A difference (CTE6-CTE7) between the constant of thermal expansion (CTE6) of the sixth lens and the constant of thermal expansion (CTE7) of the seventh lens may be 1.0 [$10^{-6}/°$ C.] or greater and 5.0 [$10^{-6}/°$ C.] or less.

Each of the lenses included in the imaging lens system may have a focal length temperature coefficient (VT), changing in accordance with a temperature. A focal length temperature coefficient (VT) of each of the lenses may be obtained by an equation below.

$$VTi = [DTni/(Ndi-1) - CTEi] - 1$$

In the equation, "VTi" is a focal length temperature coefficient of an i-th lens, "DTni" is a refractive index temperature coefficient of the i-th lens, "Ndi" is a refractive index of the i-th lens, and "CTEi" is a constant of thermal expansion of the i-th lens.

A focal length temperature coefficient obtained by the equation above may satisfy conditional equations below.

| | |
|---|---|
| $VT5 < VT4$ | Conditional Equation 5 |
| $|1/(f5*VT5)| < |1/(f4*VT4)|$ | Conditional Equation 6 |
| $1/(f4*VT4) + 1/(f6*VT6) < -2/(f5*VT5)$ | Conditional Equation 7 |

In the conditional equations 5-7, "f4" is a focal length of the fourth lens, "f5" is a focal length of the fifth lens, "f6" is a focal length of the sixth lens, "VT4" is a focal length temperature coefficient of the fourth lens, "VT5" is a focal length temperature coefficient of the fifth lens, and "VT6" is a focal length temperature coefficient of the sixth lens.

Each of the lenses included in the imaging lens system may have a negative focal length temperature coefficient.

The negative focal length temperature coefficient may be represented by a conditional equation below.

$$VTi<0 \quad \text{Conditional Equation 8}$$

Focal length temperature coefficients of the lenses disposed with the stop interposed therebetween in the imaging lens system may satisfy a conditional equation below.

$$100<VTS1-VTS2<400[10^{-6}/°\ C.] \quad \text{Conditional Equation 9}$$

In conditional equation 9, "VTS1" is a focal length temperature coefficient of a lens disposed most adjacent to an object side of the stop, and "VTS2" is a focal length temperature coefficient of a lens disposed most adjacent to an image side of the stop.

In the imaging lens system, focal length temperature coefficients of lenses adjacent to an image-side surface may satisfy a conditional equation below.

$$300<VTM2-VTM1<900[10^{-6}/°\ C.] \quad \text{Conditional Equation 10}$$

In the imaging lens system, a focal length temperature coefficient between lenses adjacent to an image-side surface may be greater than focal length temperature coefficients of lenses adjacent to an object. The configuration may be represented by a conditional equation below.

$$0<(VTO1-VTO2)/(VTM1-VTM2)<1.0 \quad \text{Conditional Equation 11}$$

In the conditional equations 10 and 11, "VTO1" is a focal length temperature coefficient of a lens disposed most adjacent to an object, "VTO2" is a focal length temperature coefficient of a lens disposed second most adjacent to an object, "VTM1" is a focal length temperature coefficient of a lens disposed most adjacent to an image-side surface, and "VTM2" is a focal length temperature coefficient of a lens disposed second most adjacent to an object-side surface.

The imaging lens system may satisfy one of conditional equations below.

$$30<V4-V5 \quad \text{Conditional Equation 12}$$

$$|f4|<2*f \quad \text{Conditional Equation 13}$$

$$|f5|<2*f \quad \text{Conditional Equation 14}$$

In the conditional equations 12-14, "V4" is an Abbe number of the fourth lens, "V5" is an Abbe number of the fifth lens, and "f" is a focal length of the imaging lens system.

In the description below, an imaging lens system will be described in accordance with one or more examples.

A first example of an imaging lens system will be described with reference to FIG. 1.

An imaging lens system 100 may include a first lens 110, a second lens 120, a third lens 130, a fourth lens 140, a fifth lens 150, a sixth lens 160, and a seventh lens 170.

The first lens 110 may have negative refractive power, and may have a convex object-side surface and a concave image-side surface. The second lens 120 may have negative refractive power, and may have a concave object-side surface and a convex image-side surface. The third lens 130 may have positive refractive power, and may have a convex object-side surface and a convex image-side surface. The fourth lens 140 may have positive refractive power, and may have a convex object-side surface and a convex image-side surface. The fifth lens 150 may have negative refractive power, and may have a concave object-side surface and a concave image-side surface. The sixth lens 160 may have positive refractive power, and may have a convex object-side surface and a convex image-side surface. The seventh lens 170 may have negative refractive power, and may have a concave object-side surface and a convex image-side surface.

The imaging lens system 100 may further include a filter 182, a cover glass 184, an image sensor 190, and a stop ST. The filter 182 and the cover glass 184 may be disposed between the seventh lens 170 and the image sensor 190. The stop ST may be disposed between the third lens 130 and the fourth lens 140.

Figure 2:
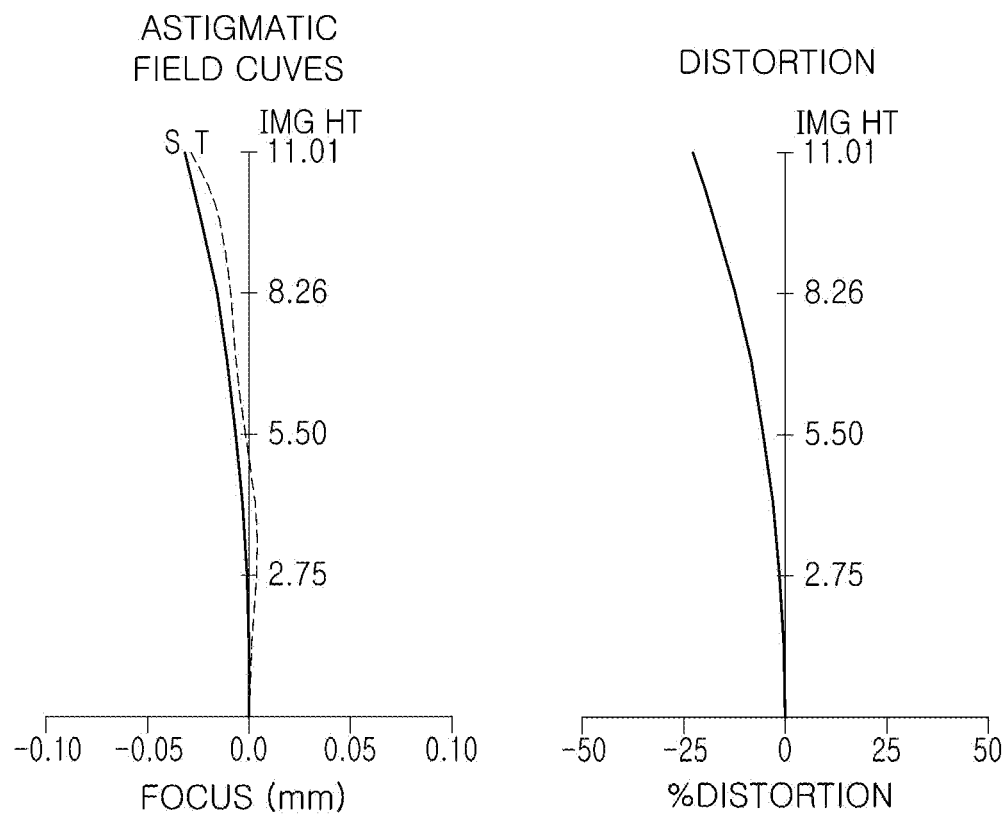
FIG. 2 shows aberration curves of the imaging lens system illustrated in FIG. 1.
Figure 3:
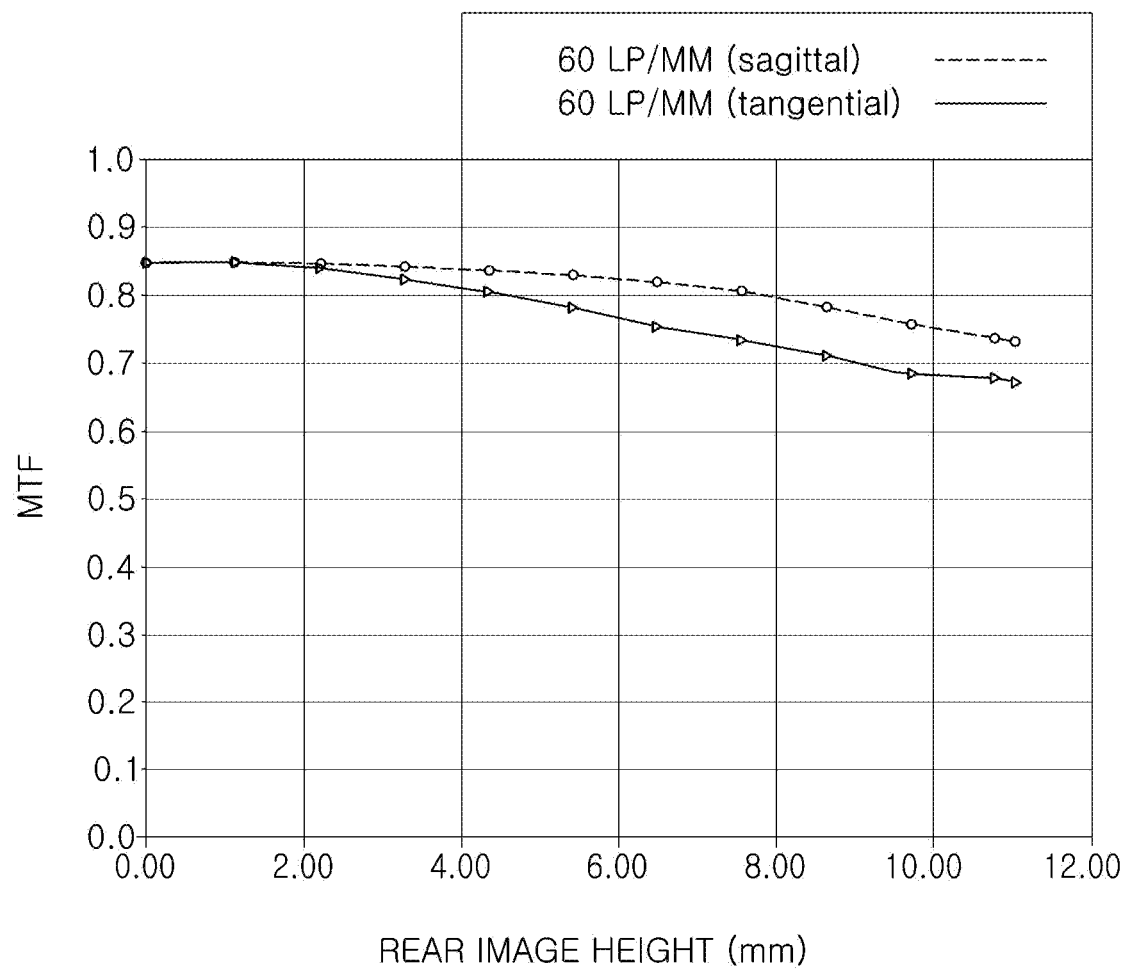
FIG. 3 shows MTF curves of the imaging lens system illustrated in FIG. 1.
Figure 4:
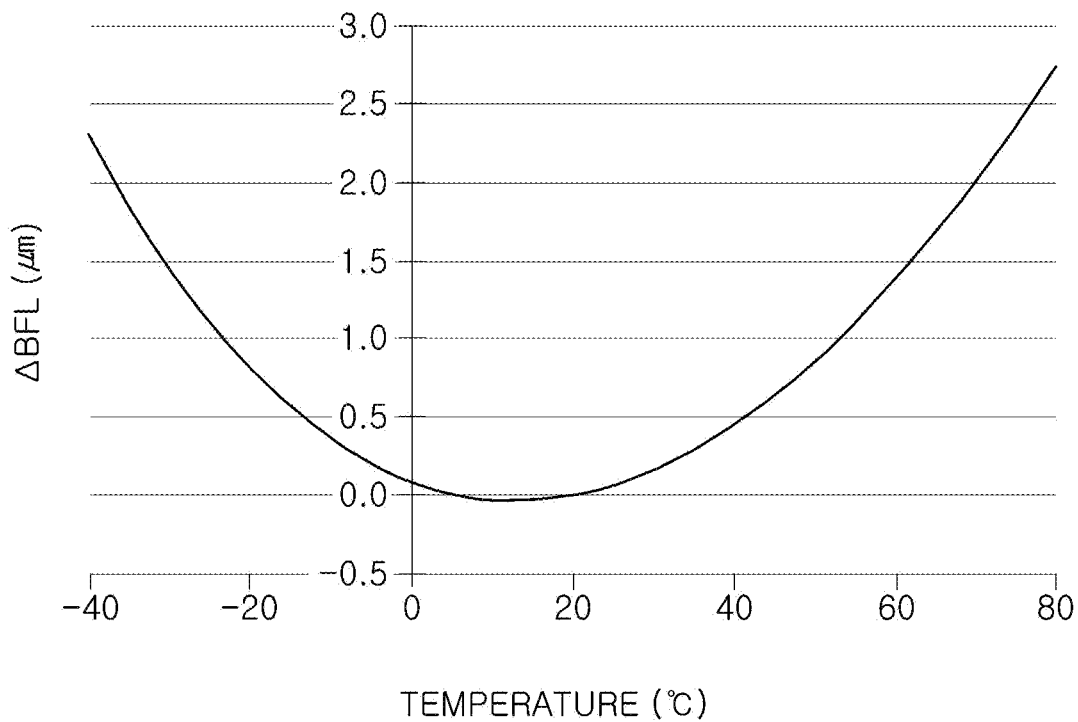
FIG. 4 shows curves representing a back focal length (BFL) of the imaging lens system illustrated in FIG. 1 in accordance with changes in temperature.

FIGS. 2 and 3 illustrate aberration properties and MTF properties of the imaging lens system 100. FIG. 4 illustrates an amount of change in back focal length (ΔBFL: μm) of the imaging lens system 100 in accordance with a temperature. As illustrated in FIG. 4, an amount of change in back focal length of the imaging lens system was 2.2 μm and 2.6 μm at −40° C. or less and at 80° C. or greater, respectively, but is 1.5 μm or less within a range of −20° C. to 60° C.

Table 1 and Table 2 list lens properties and an aspherical surface value of the imaging lens system 100.

TABLE 1

| Surface No. | Note | Radius of Curvature | Thickness/Gap | Refractive Index | Abbe Number | DTn | CTE | VT(10³) |
|---|---|---|---|---|---|---|---|---|
| 1 | First Lens | 65.772 | 2.500 | 1.7725 | 49.62 | 3.60 | 8.00 | −301.8 |
| 2 | | 13.56 | 9.131 | | | | | |
| 3 | Second Lens | −25.204 | 6.049 | 1.8348 | 42.72 | 3.80 | 8.00 | −284.2 |
| 4 | | −35.65 | 15.173 | | | | | |
| 5 | Third Lens | 62.362 | 4.599 | 1.8042 | 46.5 | 3.70 | 8.00 | −292.8 |
| 6 | | −62.362 | 6.918 | | | | | |
| 7 | Stop | Infinity | 4.000 | | | | | |
| 8 | Fourth Lens | 19.35 | 6.496 | 1.4971 | 81.56 | −6.80 | 8.00 | −46.4 |
| 9 | | −34.344 | 3.768 | | | | | |
| 10 | Fifth Lens | −90.178 | 2.550 | 1.8081 | 22.76 | −3.70 | 8.00 | −79.5 |
| 11 | | 18.264 | 4.535 | | | | | |
| 12 | Sixth Lens | 26.083 | 7.204 | 1.5928 | 68.62 | −7.00 | 11.10 | −43.7 |
| 13 | | −31.09 | 8.682 | | | | | |
| 14 | Seventh Lens | −45.976 | 3.050 | 1.7555 | 45.59 | 4.90 | 8.00 | −658.8 |
| 15 | | −120 | 0.500 | | | | | |
| 16 | Filter | Infinity | 1.100 | 1.5168 | 64.17 | | | |
| 17 | | Infinity | 0.500 | | | | | |
| 18 | Cover Glass | Infinity | 1.100 | 1.5168 | 64.17 | | | |
| 19 | | Infinity | 3.388 | | | | | |
| 20 | Image-Side Surface | Infinity | 0.000 | | | | | |

TABLE 2

| Surface No. | K | A | B | C | D |
|---|---|---|---|---|---|
| 8 | −7.7205E−01 | 5.2940E−06 | 3.4185E−08 | — | — |
| 9 | −3.4660E+00 | 2.7021E−05 | −3.4495E−08 | — | — |
| 15 | — | −7.9572E−05 | −2.2783E−07 | −9.8448E−10 | 1.3392E−11 |
| 16 | — | −7.5011E−05 | −3.6238E−07 | 1.9905E−09 | 5.4521E−13 |

Figure 5:
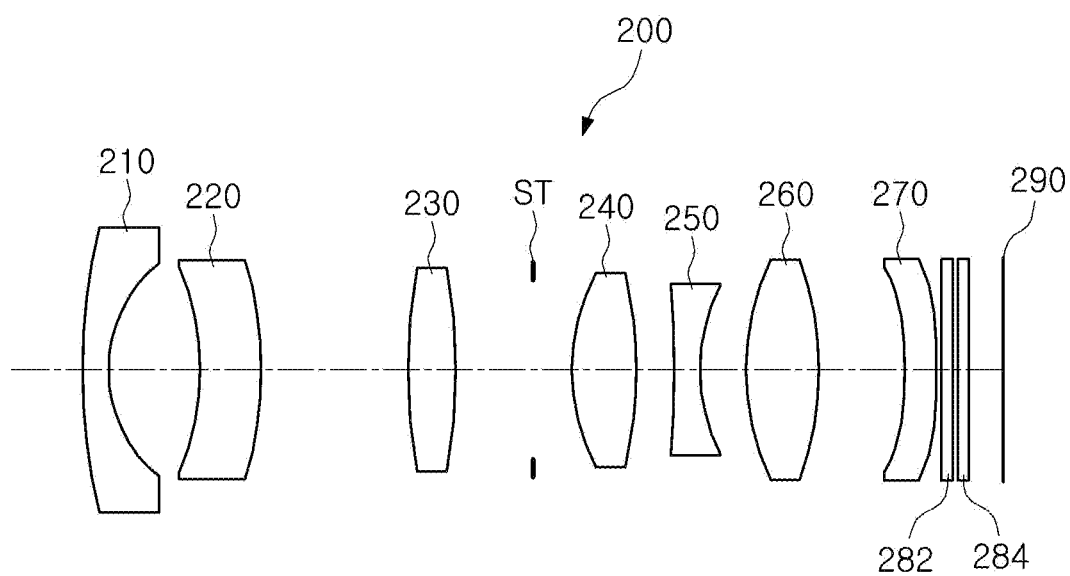
FIG. 5 is a diagram illustrating a second example of an imaging lens system.

A second example of an imaging lens system will be described with reference to FIG. 5.

An imaging lens system 200 may include a first lens 210, a second lens 220, a third lens 230, a fourth lens 240, a fifth lens 250, a sixth lens 260, and a seventh lens 270.

The first lens 210 may have negative refractive power, and may have a convex object-side surface and a concave image-side surface. The second lens 220 may have negative refractive power, and may have a concave object-side surface and a convex image-side surface. The third lens 230 may have positive refractive power, and may have a convex object-side surface and a convex image-side surface. The fourth lens 240 may have positive refractive power, and may have a convex object-side surface and a convex image-side surface. The fifth lens 250 may have negative refractive power, and may have a concave object-side surface and a concave image-side surface. The sixth lens 260 may have positive refractive power, and may have a convex object-side surface and a convex image-side surface. The seventh lens 270 may have negative refractive power, and may have a concave object-side surface and a convex image-side surface.

The imaging lens system 200 may further include a filter 282, a cover glass 284, an image sensor 290, and a stop ST. The filter 282 and the cover glass 284 may be disposed between the seventh lens 270 and the image sensor 290. The stop ST may be disposed between the third lens 230 and the fourth lens 240.

Figure 6:
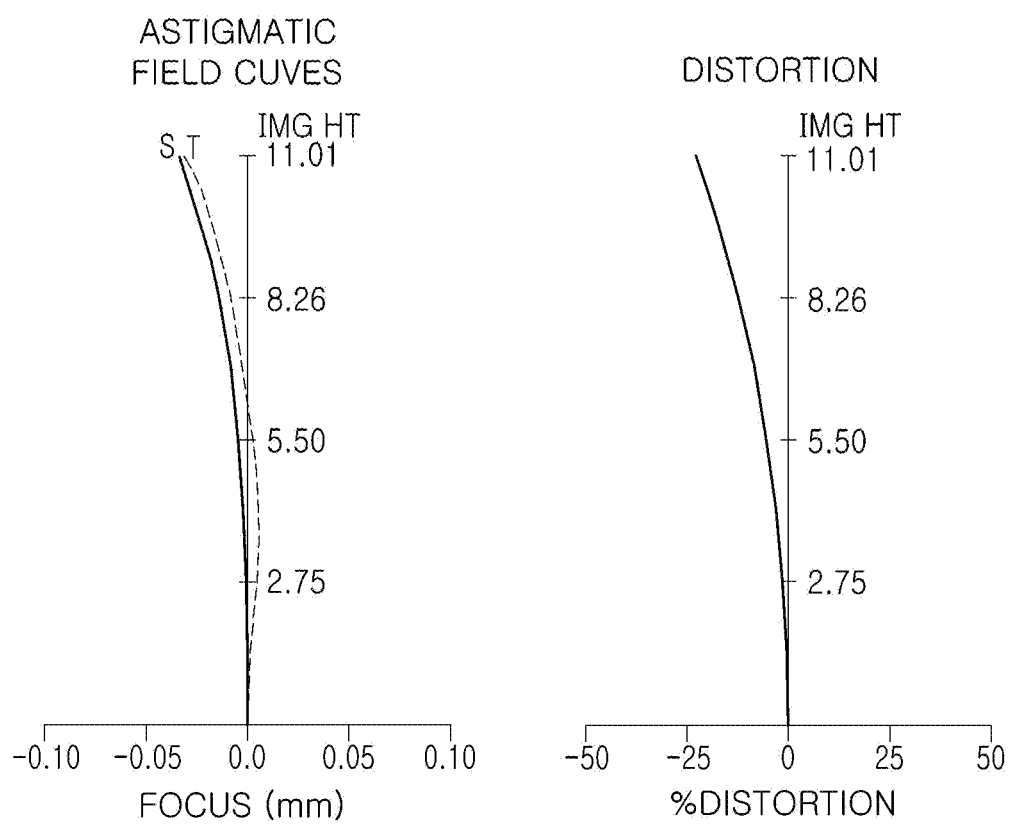
FIG. 6 shows aberration curves of the imaging lens system illustrated in FIG. 5.
Figure 7:
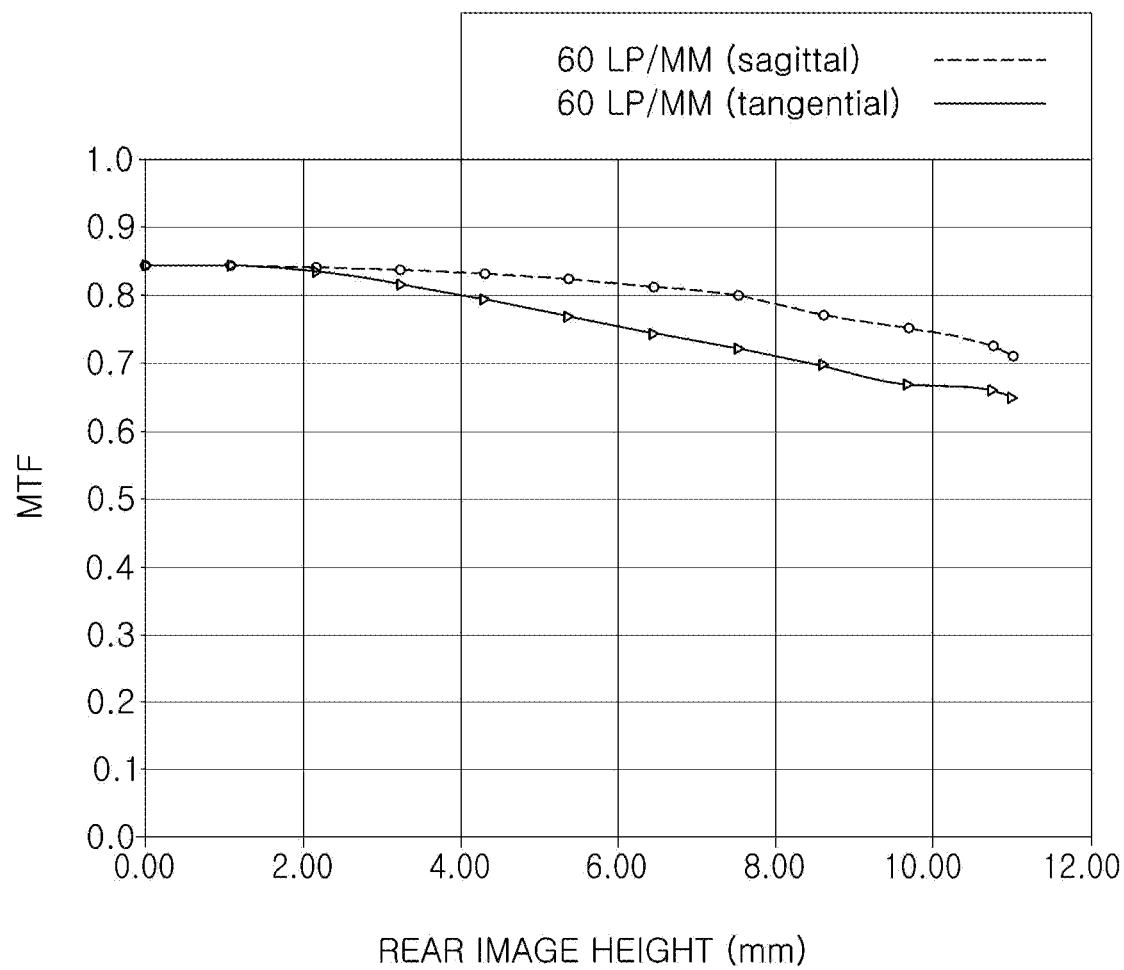
FIG. 7 shows MTF curves of the imaging lens system illustrated in FIG. 5.
Figure 8:
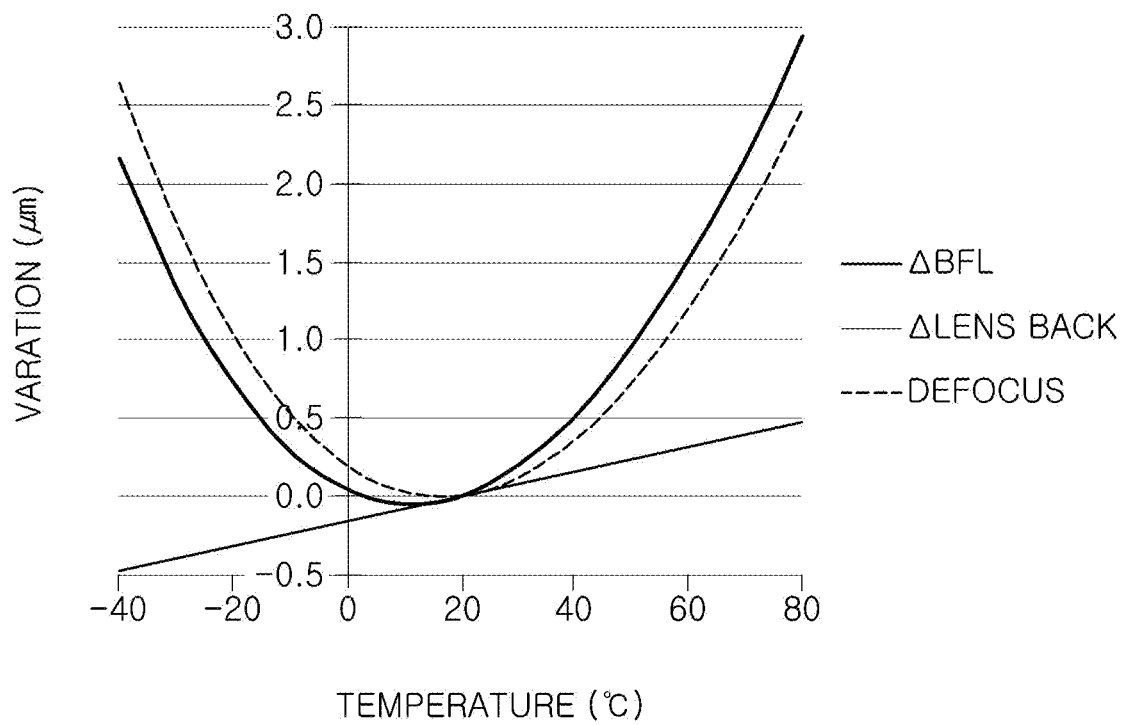
FIG. 8 shows curves representing a back focal length (BFL) of the imaging lens system illustrated in FIG. 5 in accordance with changes in temperature.

FIGS. 6 and 7 illustrate aberration properties and MTF properties of the imaging lens system 200. FIG. 8 illustrates an amount of change in back focal length (ΔBFL: μm) of the imaging lens system 200 in accordance with a temperature. As illustrated in FIG. 8, an amount of change in back focal length of the imaging lens system was expected to be 2.2 μm and 2.8 μm approximately at −40° C. or less and at 80° C. or greater, respectively. However, a substantial amount of change in back focal length (DEFOCUS) of the imaging lens system 200 decreased to ±0.5 μm even within a range of −40° C. to 80° C. using lens properties (ΔLENS BACK) in which a focal length may change in accordance with changes in temperature.

Table 3 and Table 4 list lens properties and an aspherical surface value of the imaging lens system 200.

TABLE 3

| Surface No. | Note | Radius of Curvature | Thickness/Gap | Refractive Index | Abbe Number | DTn | CTE | VT(10³) |
|---|---|---|---|---|---|---|---|---|
| 1 | First Lens | 62.561 | 2.518 | 1.773 | 49.62 | 3.60 | 8.00 | −301.8 |
| 2 | | 13.565 | 9.077 | | | | | |
| 3 | Second Lens | −27.214 | 5.900 | 1.835 | 42.72 | 3.80 | 8.00 | −284.2 |
| 4 | | −42.497 | 15.027 | | | | | |
| 5 | Third Lens | 61.159 | 4.691 | 1.804 | 46.50 | 3.70 | 8.00 | −292.8 |
| 6 | | −61.159 | 7.788 | | | | | |
| 7 | Stop | Infinity | 4.000 | | | | | |
| 8 | Fourth Lens | 19.140 | 6.496 | 1.497 | 81.56 | −6.80 | 8.00 | −46.4 |
| 9 | | −35.374 | 3.858 | | | | | |
| 10 | Fifth Lens | −96.821 | 2.550 | 1.808 | 22.76 | −3.70 | 8.00 | −79.5 |
| 11 | | 18.101 | 4.458 | | | | | |
| 12 | Sixth Lens | 26.191 | 7.327 | 1.593 | 68.62 | −7.00 | 11.10 | −43.7 |
| 13 | | −29.622 | 8.772 | | | | | |
| 14 | Seventh Lens | −42.943 | 3.050 | 1.756 | 45.59 | 4.90 | 8.00 | −658.8 |
| 15 | | −120.000 | 0.500 | | | | | |
| 16 | Filter | Infinity | 1.100 | 1.517 | 64.17 | | | |
| 17 | | Infinity | 0.500 | | | | | |
| 18 | Cover Glass | Infinity | 1.100 | 1.517 | 64.17 | | | |
| 19 | | Infinity | 3.388 | | | | | |
| 20 | Image-Side Surface | Infinity | 0.000 | | | | | |

TABLE 4

| Surface No. | K | A | B | C | D |
|---|---|---|---|---|---|
| 8 | −7.72E−01 | 5.01E−06 | 3.53E−08 | — | — |
| 9 | −3.47E+00 | 2.80E−05 | −3.40E−08 | — | — |
| 15 | — | −8.19E−05 | −1.97E−07 | −7.33E−10 | 1.23E−11 |
| 16 | — | −8.14E−05 | −3.05E−07 | 1.95E−09 | 4.71E−13 |

Figure 9:
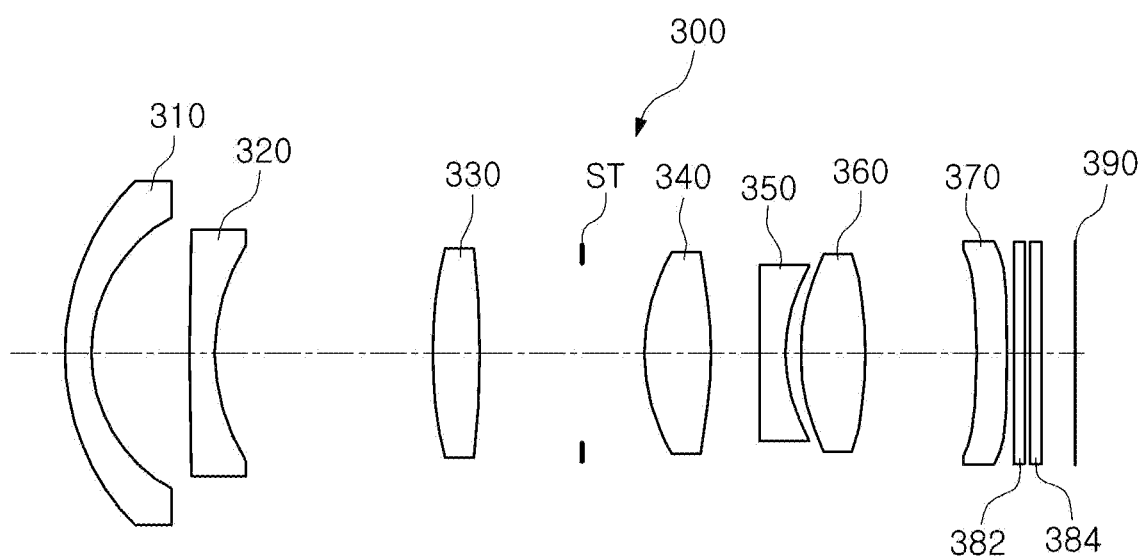
FIG. 9 is a diagram illustrating a third example of an imaging lens system.

A third example of an imaging lens system will be described with reference to FIG. 9.

An imaging lens system 300 may include a first lens 310, a second lens 320, a third lens 330, a fourth lens 340, a fifth lens 350, a sixth lens 360, and a seventh lens 370.

The first lens 310 may have negative refractive power, and may have a convex object-side surface and a concave image-side surface. The second lens 320 may have negative refractive power, and may have a convex object-side surface and a concave image-side surface. The third lens 330 may have positive refractive power, and may have a convex object-side surface and a convex image-side surface. The fourth lens 340 may have positive refractive power, and may have a convex object-side surface and a convex image-side surface. The fifth lens 350 may have negative refractive power, and may have a concave object-side surface and a concave image-side surface. The sixth lens 360 may have positive refractive power, and may have a convex object-side surface and a convex image-side surface. The seventh lens 370 may have negative refractive power, and may have a concave object-side surface and a convex image-side surface.

The imaging lens system 300 may further include a filter 382, a cover glass 384, an image sensor 390, and a stop ST. The filter 382 and the cover glass 384 may be disposed between the seventh lens 370 and the image sensor 390. The stop ST may be disposed between the third lens 330 and the fourth lens 340.

Figure 10:
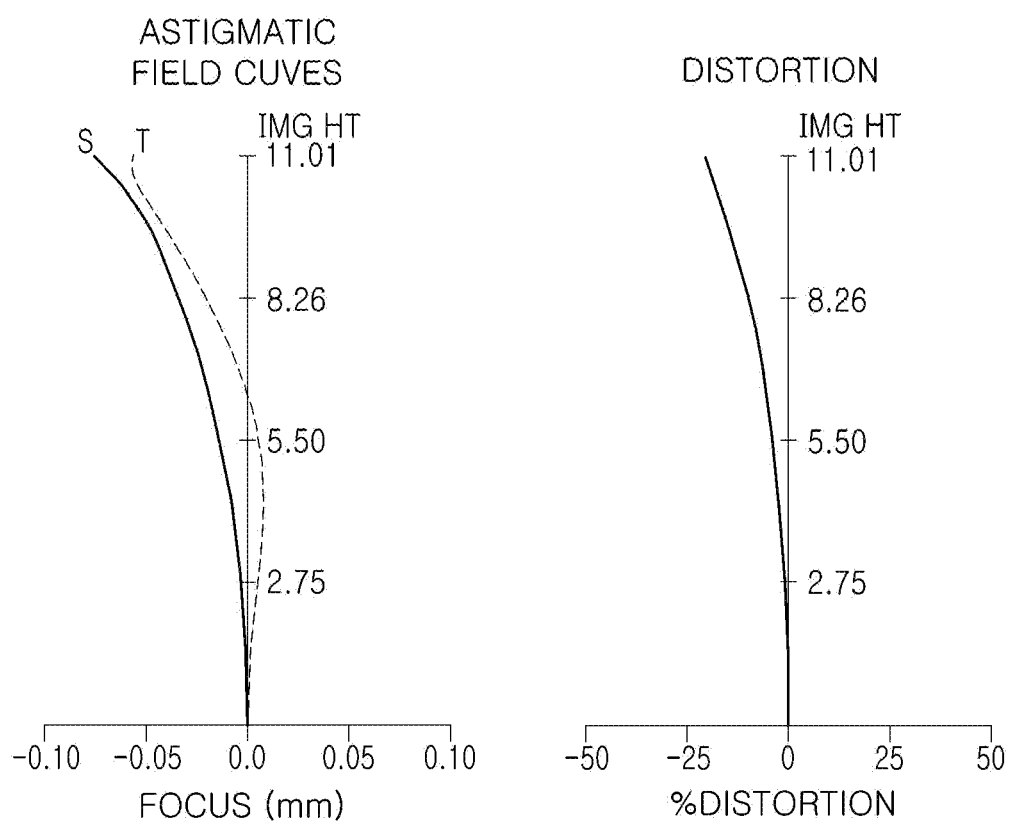
FIG. 10 shows aberration curves of the imaging lens system illustrated in FIG. 9.
Figure 11:
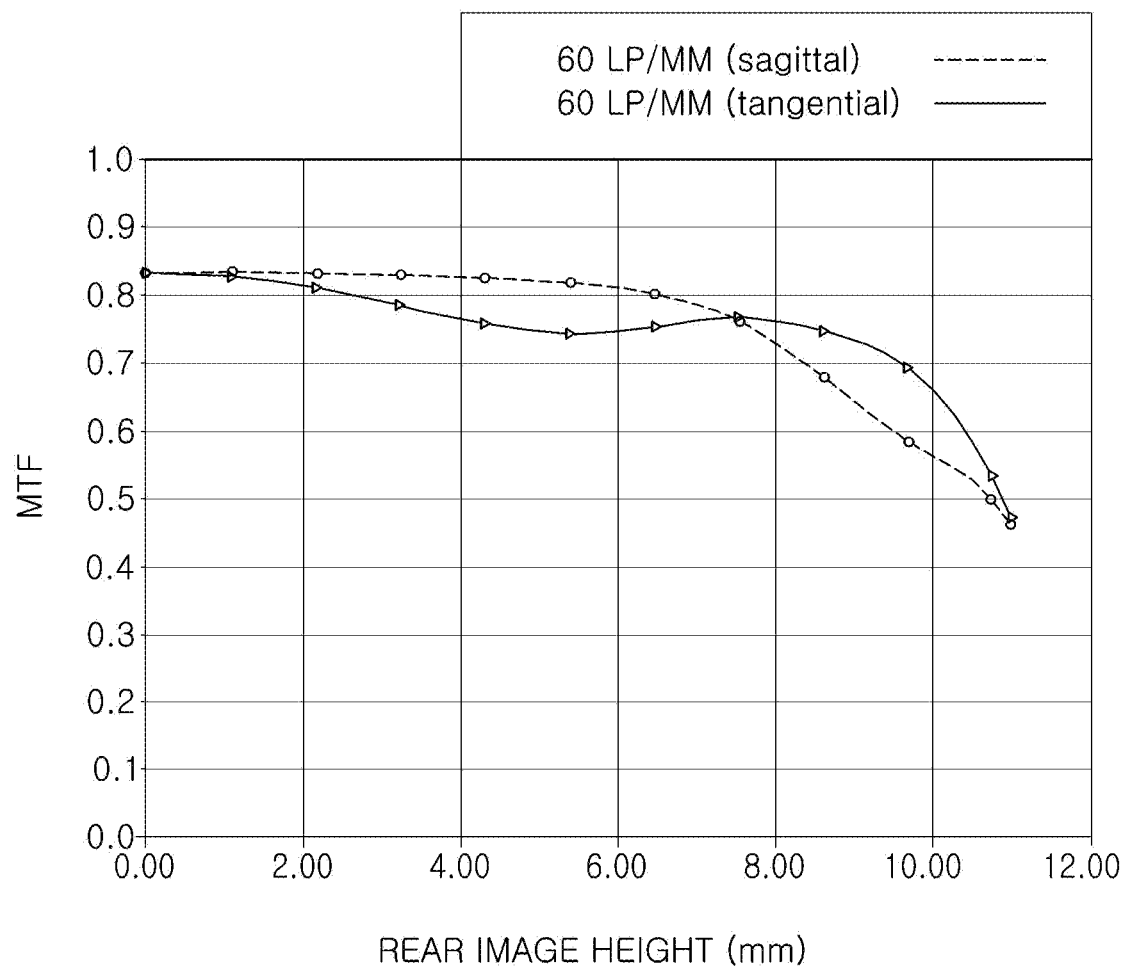
FIG. 11 shows MTF curves of the imaging lens system illustrated in FIG. 9.
Figure 12:
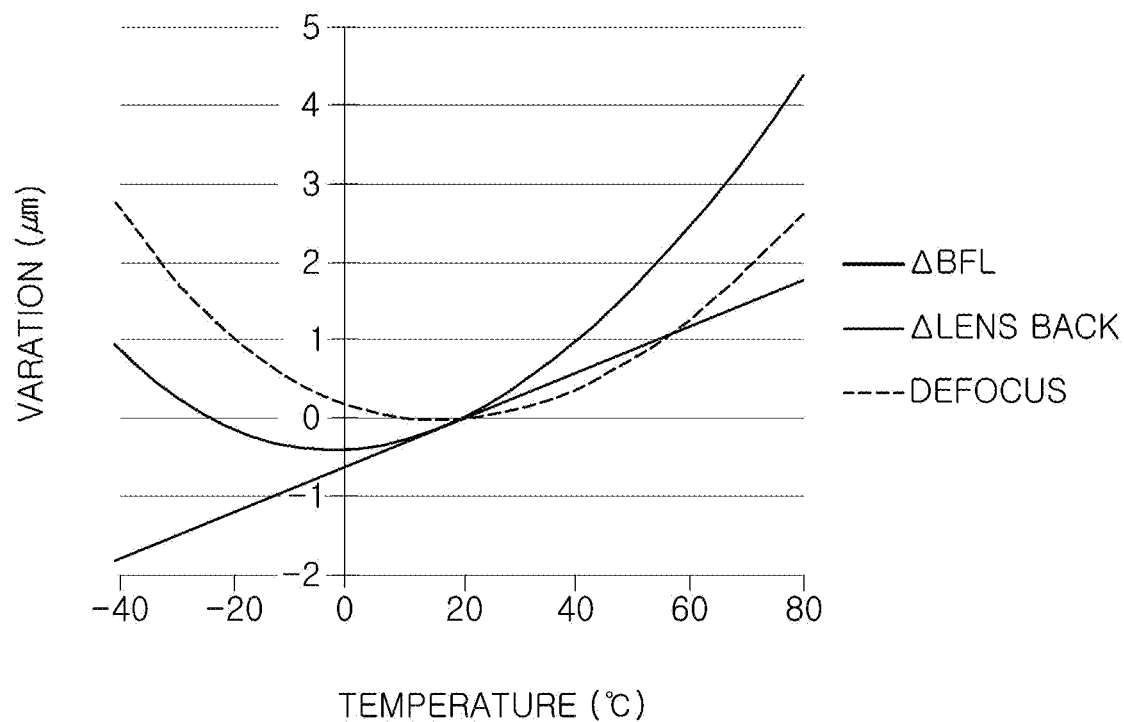
FIG. 12 shows curves representing a back focal length (BFL) of the imaging lens system illustrated in FIG. 9 in accordance with changes in temperature.

FIGS. 10 and 11 illustrate aberration properties and MTF properties of the imaging lens system 300. FIG. 12 illustrates an amount of change in back focal length (ΔBFL: μm) of the imaging lens system 300 in accordance with a temperature. As illustrated in FIG. 12, an amount of change in back focal length of the imaging lens system was expected to be 1.0 μm and 4.6 μm approximately at −40° C. or less and at 80° C. or greater, respectively. However, a substantial amount of change in back focal length (DEFOCUS) of the imaging lens system 300 decreased to ±2.0 μm even within a range of −40° C. to 80° C. using lens properties (ΔLENS BACK) in which a focal length may change in accordance with changes in temperature.

Table 5 and Table 6 list lens properties and an aspherical surface value of the imaging lens system 300.

TABLE 5

| Surface No. | Note | Radius of Curvature | Thickness/Gap | Refractive Index | Abbe Number | DTn | CTE | VT($10^3$) |
|---|---|---|---|---|---|---|---|---|
| 1 | First Lens | 24.328 | 2.598 | 1.773 | 49.62 | 3.60 | 8.00 | −301.8 |
| 2 | | 15.264 | 9.725 | | | | | |
| 3 | Second Lens | 500.000 | 2.500 | 1.835 | 42.72 | 3.80 | 8.00 | −284.2 |
| 4 | | 20.273 | 21.609 | | | | | |
| 5 | Third Lens | 49.060 | 4.691 | 1.804 | 46.50 | 3.70 | 8.00 | −292.8 |
| 6 | | −85.802 | 10.081 | | | | | |
| 7 | Stop | Infinity | 6.266 | | | | | |
| 8 | Fourth Lens | 20.279 | 6.546 | 1.497 | 81.56 | −6.80 | 8.00 | −46.4 |
| 9 | | −36.788 | 4.915 | | | | | |
| 10 | Fifth Lens | −302.321 | 2.500 | 1.808 | 22.76 | −3.70 | 8.00 | −79.5 |
| 11 | | 17.125 | 1.521 | | | | | |
| 12 | Sixth Lens | 22.180 | 6.392 | 1.593 | 68.62 | −7.00 | 11.10 | −43.7 |
| 13 | | −37.145 | 11.003 | | | | | |
| 14 | Seventh Lens | −53.514 | 3.050 | 1.756 | 45.59 | 4.90 | 8.00 | −658.8 |
| 15 | | −120.000 | 0.500 | | | | | |
| 16 | Filter | Infinity | 1.100 | 1.517 | 64.17 | | | |
| 17 | | Infinity | 0.500 | | | | | |
| 18 | Cover Glass | Infinity | 1.100 | 1.517 | 64.17 | | | |
| 19 | | Infinity | 3.390 | | | | | |
| 20 | Image-Side Surface | Infinity | 0.000 | | | | | |

TABLE 6

| Surface No. | K | A | B | C | D |
|---|---|---|---|---|---|
| 8 | −7.72E−01 | 3.51E−06 | 4.83E−08 | — | — |
| 9 | −3.47E+00 | 2.82E−05 | −1.04E−08 | — | — |
| 15 | — | 1.33E−05 | −4.56E−07 | 2.63E−10 | −4.37E−12 |
| 16 | — | 1.04E−05 | −6.41E−07 | 1.66E−10 | 2.85E−12 |

A fourth example of an imaging lens system will be described with reference to FIG. 13.

An imaging lens system 400 may include a first lens 410, a second lens 420, a third lens 430, a fourth lens 440, a fifth lens 450, a sixth lens 460, and a seventh lens 470.

The first lens 410 may have negative refractive power, and may have a convex object-side surface and a concave image-side surface. The second lens 420 may have negative refractive power, and may have a concave object-side surface and a convex image-side surface. The third lens 430 may have positive refractive power, and may have a convex object-side surface and a convex image-side surface. The fourth lens 440 may have positive refractive power, and may have a convex object-side surface and a convex image-side surface. The fifth lens 450 may have negative refractive power, and may have a concave object-side surface and a concave image-side surface. The sixth lens 460 may have positive refractive power, and may have a convex object-side surface and a convex image-side surface. The seventh lens 470 may have negative refractive power, and may have a concave object-side surface and a convex image-side surface.

The imaging lens system 400 may further include a filter 482, a cover glass 484, an image sensor 490, and a stop ST. The filter 482 and the cover glass 484 may be disposed between the seventh lens 470 and the image sensor 490. The stop ST may be disposed between the third lens 430 and the fourth lens 440.

Figure 14:
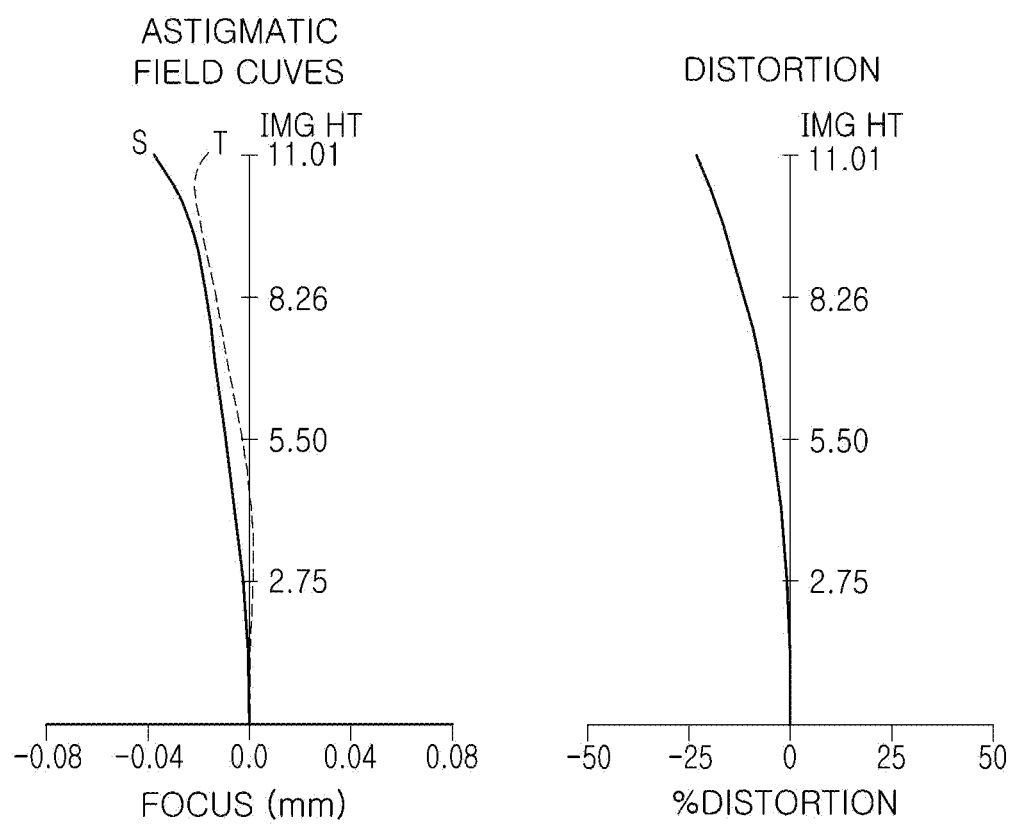
FIG. 14 shows aberration curves of the imaging lens system illustrated in FIG. 13.
Figure 15:
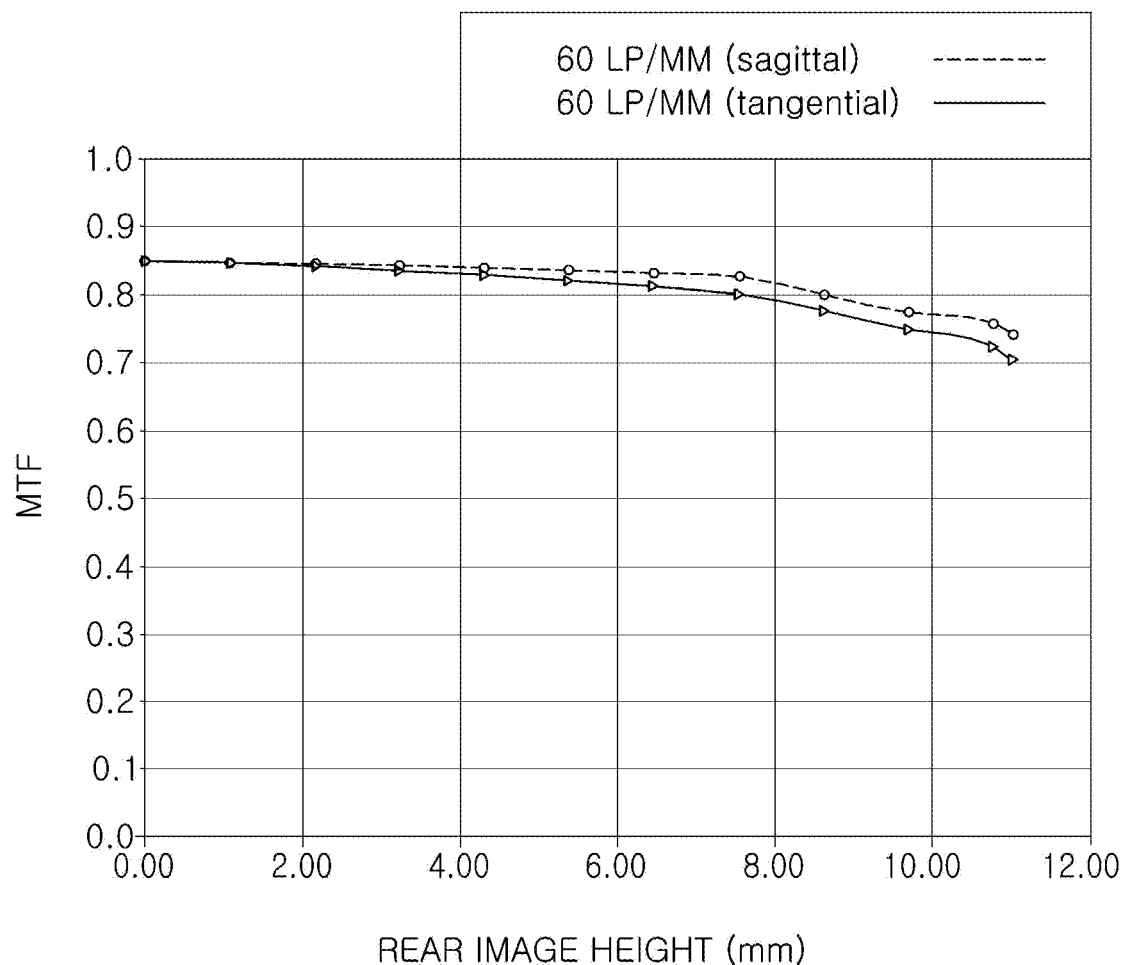
FIG. 15 shows MTF curves of the imaging lens system illustrated in FIG. 13.
Figure 16:
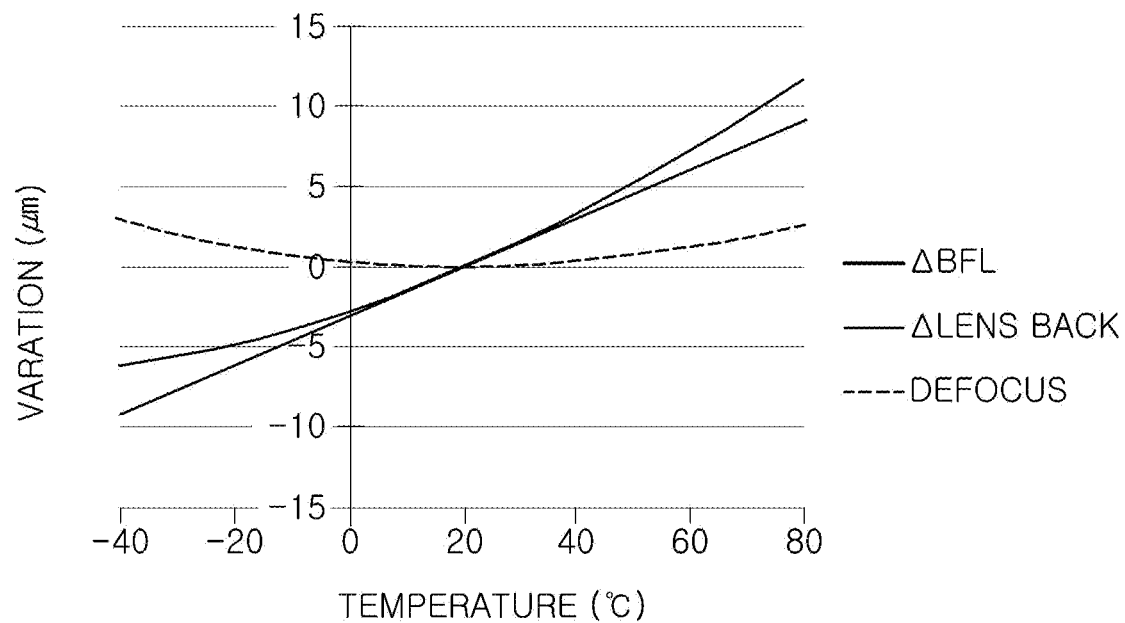
FIG. 16 shows curves representing a back focal length (BFL) of the imaging lens system illustrated in FIG. 13 in accordance with changes in temperature.

FIGS. 14 and 15 illustrate aberration properties and MTF properties of the imaging lens system 400. FIG. 16 illustrates an amount of change in back focal length (ΔBFL: μm) of the imaging lens system 400 in accordance with a temperature. As illustrated in FIG. 16, an amount of change in back focal length of the imaging lens system 400 is −6.0 μm and 12 μm approximately, at −40° C. or less and at 80° C. or greater, respectively. However, a substantial amount of change in back focal length (DEFOCUS) of the imaging lens system 400 decreased to 3.0 μm even within a range of −40° C. to 80° C. using lens properties (ΔLENS BACK) in which a focal length may change in accordance with changes in temperature.

Table 7 and Table 8 list lens properties and an aspherical surface value of the imaging lens system 400.

TABLE 7

| Surface No. | Note | Radius of Curvature | Thickness/Gap | Refractive Index | Abbe Number | DTn | CTE | VT(10³) |
|---|---|---|---|---|---|---|---|---|
| 1 | First Lens | 73.796 | 2.549 | 1.773 | 49.62 | 3.60 | 8.00 | −301.8 |
| 2 | | 13.356 | 9.898 | | | | | |
| 3 | Second Lens | −21.157 | 6.310 | 1.835 | 42.72 | 3.80 | 8.00 | −284.2 |
| 4 | | −27.375 | 12.715 | | | | | |
| 5 | Third Lens | 74.491 | 4.790 | 1.835 | 42.72 | 3.80 | 8.00 | −284.2 |
| 6 | | −74.491 | 5.794 | | | | | |
| 7 | Stop | Infinity | 4.847 | | | | | |
| 8 | Fourth Lens | 19.719 | 6.925 | 1.497 | 81.56 | −6.80 | 8.00 | −46.4 |
| 9 | | −30.988 | 3.171 | | | | | |
| 10 | Fifth Lens | −121.884 | 2.500 | 1.808 | 22.76 | −3.70 | 8.00 | −79.5 |
| 11 | | 20.397 | 1.792 | | | | | |
| 12 | Sixth Lens | 25.066 | 6.017 | 1.593 | 68.62 | −7.00 | 11.10 | −43.7 |
| 13 | | −67.459 | 10.091 | | | | | |
| 14 | Seventh Lens | −86.229 | 6.000 | 1.770 | 49.35 | 3.80 | 7.40 | −401.9 |
| 15 | | −120.000 | 0.500 | | | | | |
| 16 | Filter | Infinity | 1.100 | 1.517 | 64.17 | | | |
| 17 | | Infinity | 0.500 | | | | | |
| 18 | Cover Glass | Infinity | 1.100 | 1.517 | 64.17 | | | |
| 19 | | Infinity | 3.388 | | | | | |
| 20 | Image-Side Surface | Infinity | 0.000 | | | | | |

TABLE 8

| Surface No. | K | A | B | C | D |
|---|---|---|---|---|---|
| 8 | −7.72E−01 | 4.69E−06 | 2.63E−08 | — | — |
| 9 | −3.47E+00 | 1.96E−05 | −2.34E−08 | — | — |
| 15 | — | −5.35E−05 | −3.29E−07 | −9.15E−10 | −4.88E−12 |
| 16 | — | −3.68E−05 | −3.84E−07 | 3.62E−10 | 1.79E−12 |

Figure 17:
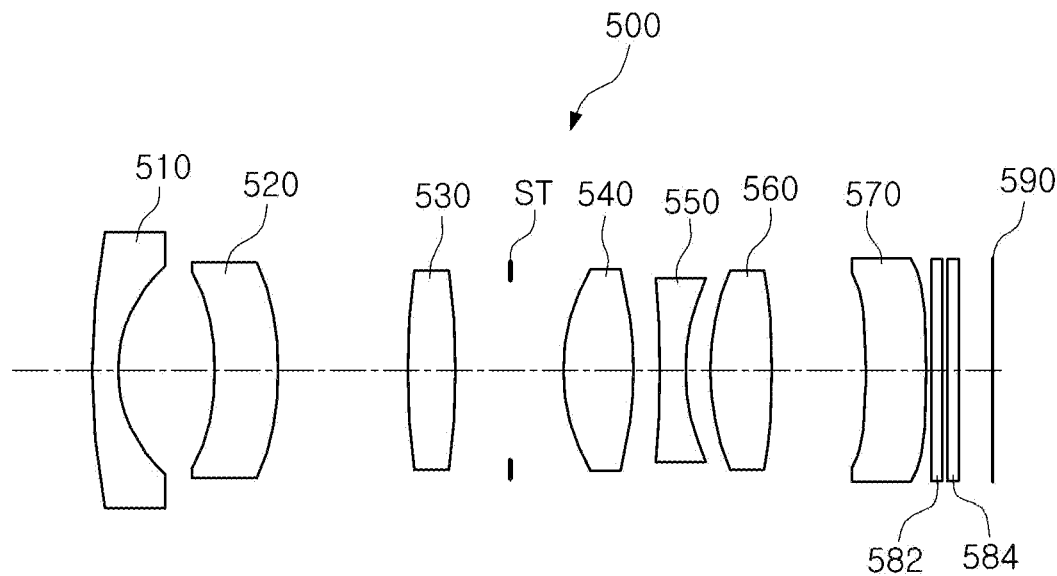
FIG. 17 is a diagram illustrating a fifth example of an imaging lens system.

A fifth example of an imaging lens system will be described with reference to FIG. 17.

An imaging lens system 500 may include a first lens 510, a second lens 520, a third lens 530, a fourth lens 540, a fifth lens 550, a sixth lens 560, and a seventh lens 570.

The first lens 510 may have negative refractive power, and may have a convex object-side surface and a concave image-side surface. The second lens 520 may have negative refractive power, and may have a concave object-side surface and a convex image-side surface. The third lens 530 may have positive refractive power, and may have a convex object-side surface and a convex image-side surface. The fourth lens 540 may have positive refractive power, and may have a convex object-side surface and a convex image-side surface. The fifth lens 550 may have negative refractive power, and may have a concave object-side surface and a concave image-side surface. The sixth lens 560 may have positive refractive power, and may have a convex object-side surface and a convex image-side surface. The seventh lens 570 may have negative refractive power, and may have a concave object-side surface and a convex image-side surface.

The imaging lens system 500 may further include a filter 582, a cover glass 584, an image sensor 590, and a stop ST. The filter 582 and the cover glass 584 may be disposed between the seventh lens 570 and the image sensor 590. The stop ST may be disposed between the third lens 530 and the fourth lens 540.

Figure 18:
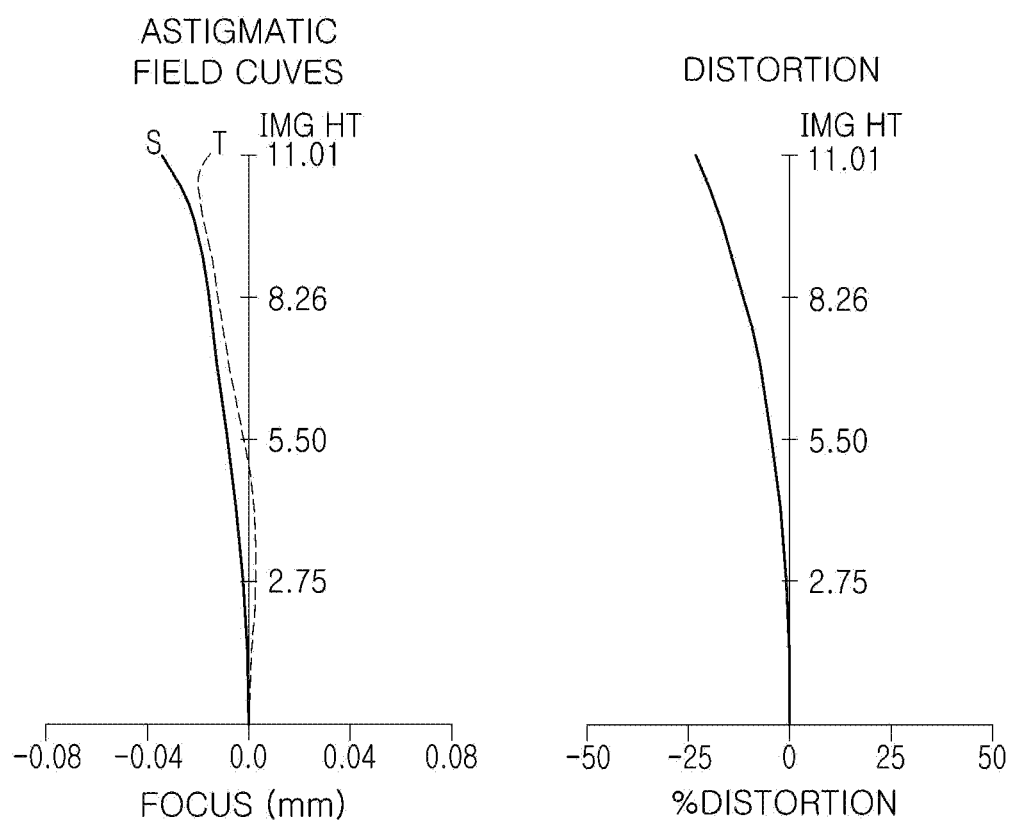
FIG. 18 shows aberration curves of the imaging lens system illustrated in FIG. 17.
Figure 19:
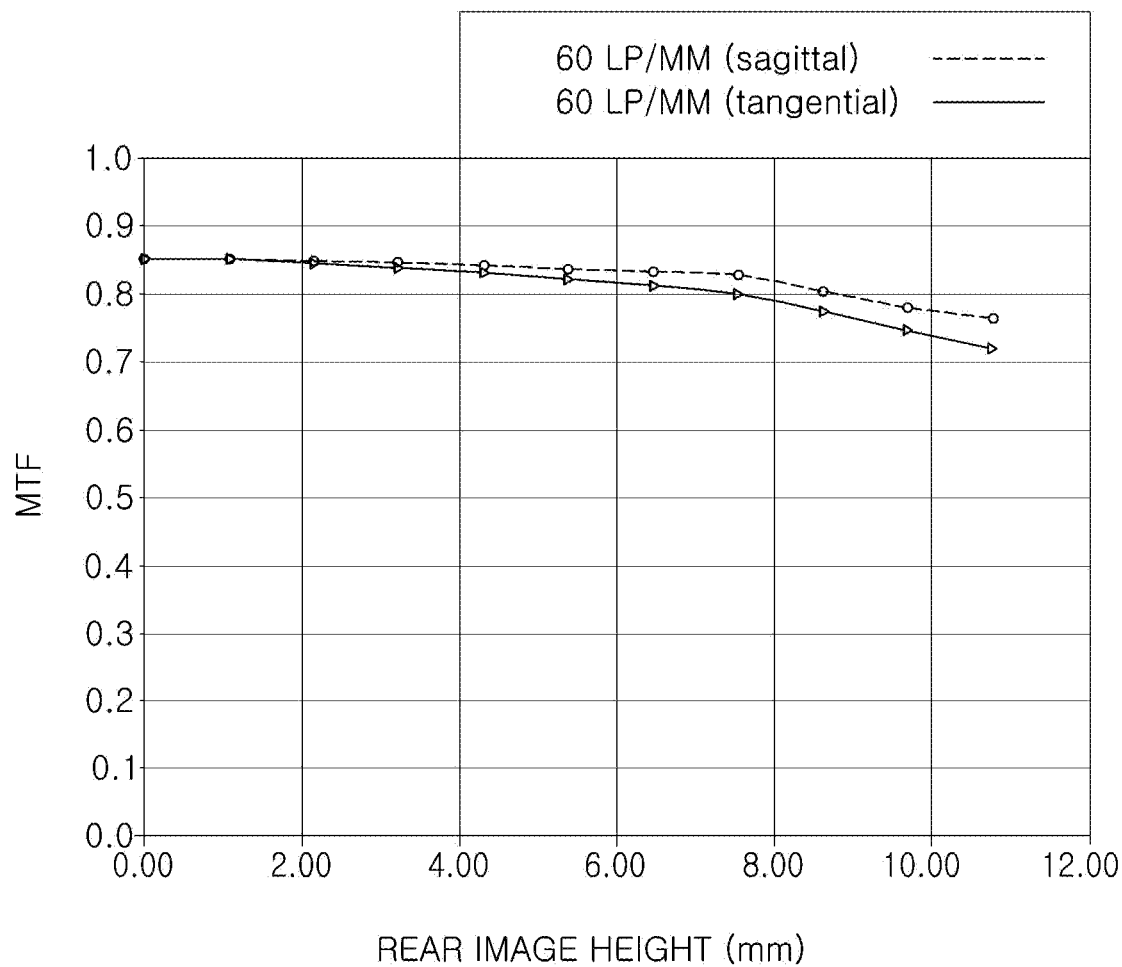
FIG. 19 shows MTF curves of the imaging lens system illustrated in FIG. 17.
Figure 20:
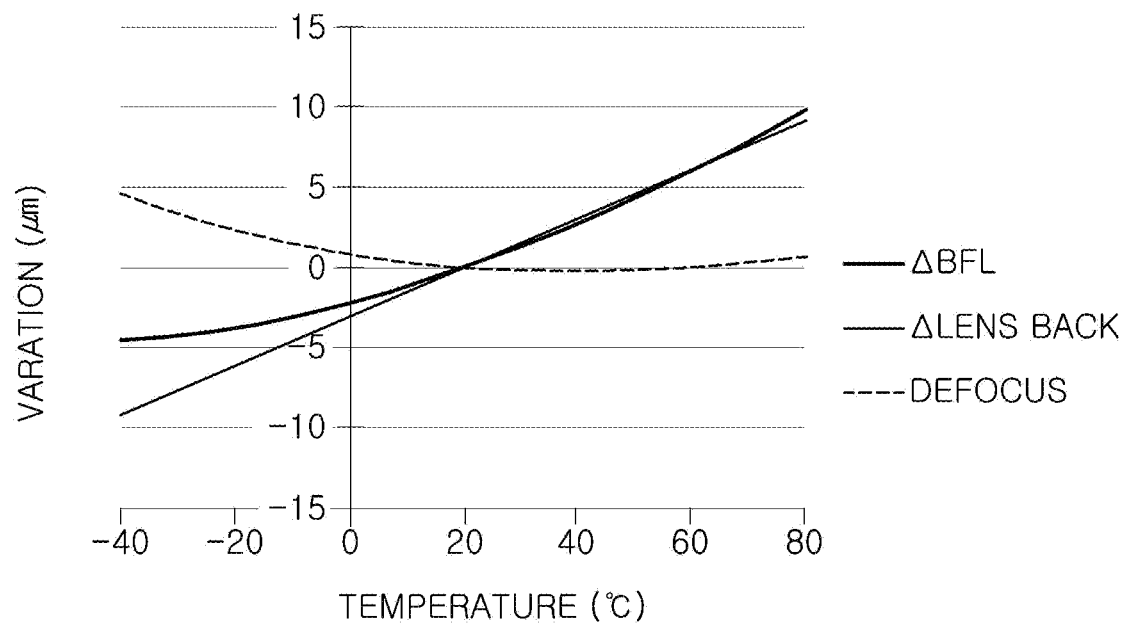
FIG. 20 shows curves representing a back focal length (BFL) of the imaging lens system illustrated in FIG. 17 in accordance with changes in temperature.

FIGS. 18 and 19 illustrate aberration properties and MTF properties of the imaging lens system 500. FIG. 20 illustrates an amount of change in back focal length (ΔBFL: μm) of the imaging lens system 500 in accordance with a temperature. As illustrated in FIG. 20, an amount of change in back focal length of the imaging lens system was expected to be −4.0 μm and 10 μm approximately at −20° C. or less and at 80° C. or greater, respectively. However, a substantial amount of change in back focal length (DEFOCUS) of the imaging lens system 500 decreased to 2.5 μm even within a range of −20° C. to 80° C. using lens properties (ΔLENS BACK) in which a focal length may change in accordance with changes in temperature.

Table 9 and Table 10 list lens properties and an aspherical surface value of the imaging lens system 500.

TABLE 9

| Surface No. | Note | Radius of Curvature | Thickness/Gap | Refractive Index | Abbe Number | DTn | CTE | VT(10³) |
|---|---|---|---|---|---|---|---|---|
| 1 | First Lens | 73.449 | 2.590 | 1.773 | 49.62 | 3.60 | 8.00 | −301.8 |
| 2 | | 13.367 | 9.679 | 1.000 | 0.00 | | | |
| 3 | Second Lens | −21.099 | 6.296 | 1.835 | 42.72 | 3.80 | 8.00 | −284.2 |
| 4 | | −27.339 | 12.933 | 1.000 | 0.00 | | | |
| 5 | Third Lens | 70.821 | 4.826 | 1.835 | 42.72 | 3.80 | 8.00 | −284.2 |
| 6 | | −70.821 | 5.420 | 1.000 | 0.00 | | | |
| 7 | Stop | Infinity | 5.435 | 1.000 | 0.00 | | | |
| 8 | Fourth Lens | 19.439 | 6.942 | 1.497 | 81.56 | −6.80 | 8.00 | −46.4 |
| 9 | | −30.510 | 2.682 | 1.000 | 0.00 | | | |
| 10 | Fifth Lens | −94.519 | 2.500 | 1.808 | 22.76 | −3.70 | 8.00 | −79.5 |
| 11 | | 21.323 | 2.469 | 1.000 | 0.00 | | | |
| 12 | Sixth Lens | 25.687 | 6.178 | 1.593 | 68.62 | −7.00 | 11.10 | −43.7 |
| 13 | | −62.987 | 9.450 | 1.000 | 0.00 | | | |
| 14 | Seventh Lens | −72.856 | 6.000 | 1.770 | 49.35 | 3.80 | 7.40 | −401.9 |
| 15 | | −120.000 | 0.500 | 1.000 | 0.00 | | | |
| 16 | Filter | Infinity | 1.100 | 1.517 | 64.17 | | | |
| 17 | | Infinity | 0.500 | 1.000 | 0.00 | | | |
| 18 | Cover Glass | Infinity | 1.100 | 1.517 | 64.17 | | | |
| 19 | | Infinity | 3.389 | 1.000 | 0.00 | | | |
| 20 | Image-Side Surface | Infinity | 0.000 | 1.000 | 0.00 | | | |

TABLE 10

| Surface No. | K | A | B | C | D |
|---|---|---|---|---|---|
| 8 | −7.72E−01 | 6.35E−06 | 2.83E−08 | — | — |
| 9 | −3.47E+00 | 2.19E−05 | −3.10E−08 | — | — |
| 15 | — | −5.36E−05 | −3.43E−07 | −1.03E−09 | −2.78E−12 |
| 16 | — | −3.30E−05 | −4.21E−07 | 6.41E−10 | 1.35E−12 |

Figure 21:
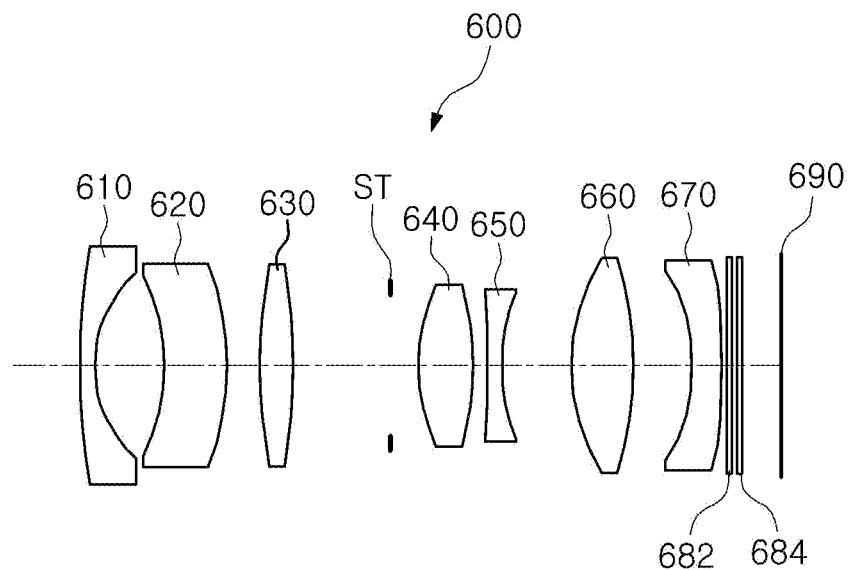
FIG. 21 is a diagram illustrating a sixth example of an imaging lens system.

A sixth example of an imaging lens system will be described with reference to FIG. 21.

An imaging lens system 600 may include a first lens 610, a second lens 620, a third lens 630, a fourth lens 640, a fifth lens 650, a sixth lens 660, and a seventh lens 670.

The first lens 610 may have negative refractive power, and may have a convex object-side surface and a concave image-side surface. The second lens 620 may have negative refractive power, and may have a concave object-side surface and a convex image-side surface. The third lens 630 may have positive refractive power, and may have a convex object-side surface and a convex image-side surface. The fourth lens 640 may have positive refractive power, and may have a convex object-side surface and a convex image-side surface. The fifth lens 650 may have negative refractive power, and may have a concave object-side surface and a concave image-side surface. The sixth lens 660 may have positive refractive power, and may have a convex object-side surface and a convex image-side surface. The seventh lens 670 may have negative refractive power, and may have a concave object-side surface and a convex image-side surface.

The imaging lens system 600 may further include a filter 682, a cover glass 684, an image sensor 690, and a stop ST. The filter 682 and the cover glass 684 may be disposed between the seventh lens 670 and the image sensor 690. The stop ST may be disposed between the third lens 630 and the fourth lens 640.

Figure 22:
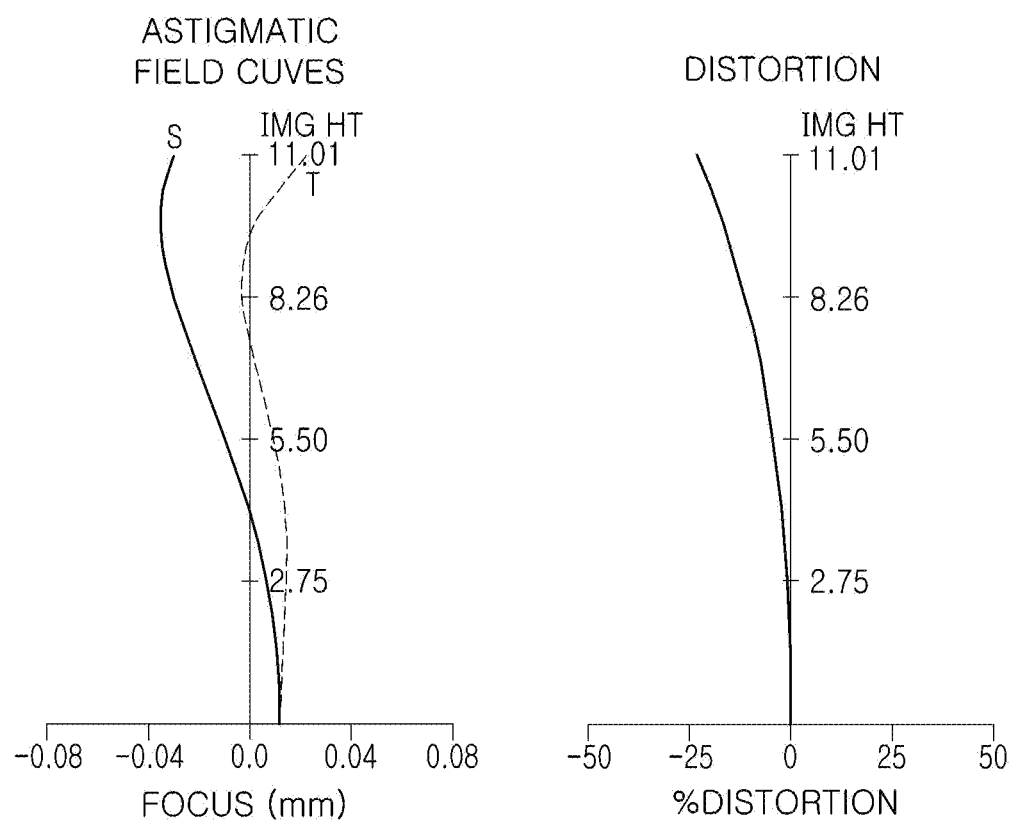
FIG. 22 shows aberration curves of the imaging lens system illustrated in FIG. 21.
Figure 23:
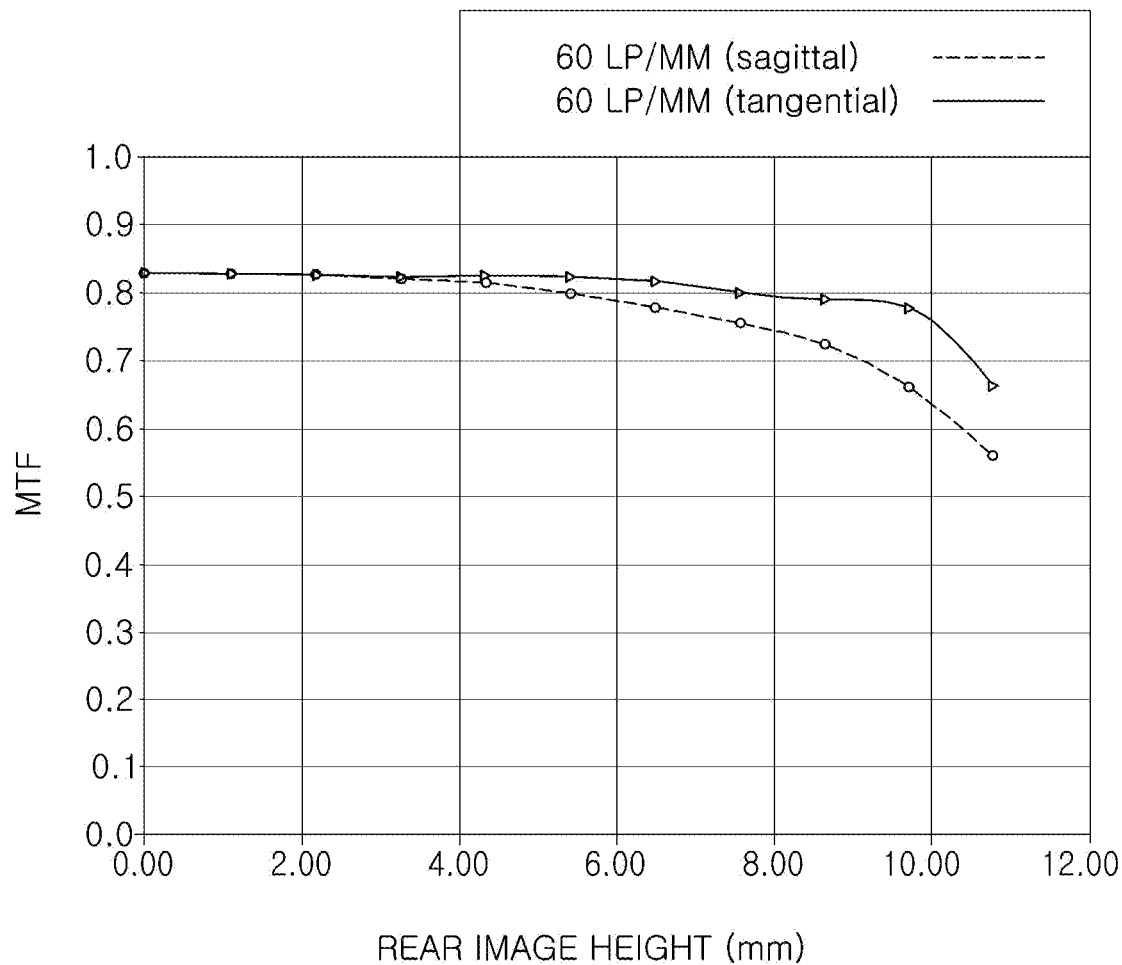
FIG. 23 shows MTF curves of the imaging lens system illustrated in FIG. 21.
Figure 24:
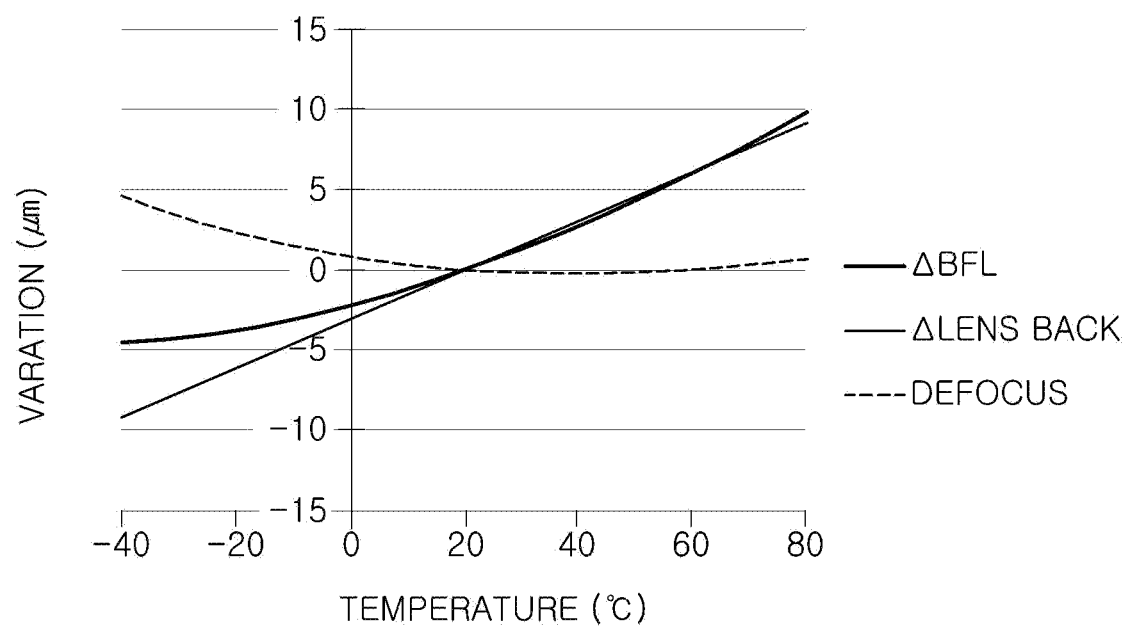
FIG. 24 shows curves representing a back focal length (BFL) of the imaging lens system illustrated in FIG. 17 in accordance with changes in temperature.

FIGS. 22 and 23 illustrate aberration properties and MTF properties of the imaging lens system 600. FIG. 24 illustrates an amount of change in back focal length (ΔBFL: μm) of the imaging lens system 600 in accordance with a temperature. As illustrated in FIG. 24, an amount of change in back focal length of the imaging lens system was expected to be −4.0 μm and 10 μm approximately at −20° C. or less and at 80° C. or greater, respectively. However, a substantial amount of change in back focal length (DEFOCUS) of the imaging lens system 600 decreased to 2.5 μm even within a range of −20° C. to 80° C. using lens properties (ΔLENS BACK) in which a focal length may change in accordance with changes in temperature.

Table 11 and Table 12 list lens properties and an aspherical surface value of the imaging lens system 600.

TABLE 11

| Surface No. | Note | Radius of Curvature | Thickness/Gap | Refractive Index | Abbe Number | DTn | CTE | VT(10³) |
|---|---|---|---|---|---|---|---|---|
| 1 | First Lens | 69.503 | 1.500 | 1.773 | 49.62 | 3.60 | 8.00 | −301.8 |
| 2 | | 12.132 | 6.891 | 1.000 | 0.00 | | | |
| 3 | Second Lens | −19.552 | 6.214 | 1.835 | 43.13 | 3.80 | 8.00 | −289.7 |
| 4 | | −27.113 | 3.304 | 1.000 | 0.00 | | | |
| 5 | Third Lens | 52.797 | 3.324 | 1.835 | 43.13 | 3.80 | 8.00 | −289.7 |
| 6 | | −55.126 | 9.687 | 1.000 | 0.00 | | | |
| 7 | Stop | Infinity | 2.811 | 1.000 | 0.00 | | | |
| 8 | Fourth Lens | 17.961 | 5.432 | 1.553 | 71.68 | −7.40 | 8.00 | −46.9 |
| 9 | | −23.868 | 1.423 | 1.000 | 0.00 | | | |
| 10 | Fifth Lens | −101.211 | 1.500 | 1.808 | 22.76 | −3.70 | 8.00 | −79.5 |
| 11 | | 19.934 | 6.972 | 1.000 | 0.00 | | | |
| 12 | Sixth Lens | 20.272 | 6.096 | 1.619 | 63.85 | −4.20 | 8.80 | −64.3 |
| 13 | | −34.491 | 5.846 | 1.000 | 0.00 | | | |
| 14 | Seventh Lens | −22.863 | 3.000 | 1.810 | 40.95 | 5.60 | 7.40 | −888.4 |
| 15 | | −120.000 | 0.500 | 1.000 | 0.00 | | | |
| 16 | Filter | Infinity | 0.500 | 1.517 | 64.17 | | | |
| 17 | | Infinity | 0.500 | 1.000 | 0.00 | | | |
| 18 | Cover Glass | Infinity | 0.500 | 1.517 | 64.17 | | | |
| 19 | | Infinity | 4.006 | 1.000 | 0.00 | | | |
| 20 | Image-Side Surface | Infinity | −0.012 | 1.000 | 0.00 | | | |

TABLE 12

| Surface No. | K | A | B | C | D |
|---|---|---|---|---|---|
| 8 | −7.72E−01 | 4.99E−08 | 6.95E−09 | — | — |
| 9 | −3.47E+00 | 2.45E−05 | −5.69E−08 | — | — |
| 15 | — | −9.06E−05 | −2.41E−07 | 1.27E−09 | 8.58E−12 |
| 16 | — | −4.84E−05 | −3.36E−07 | 2.69E−09 | −4.94E−12 |

The imaging lens system in the examples may have optical properties as below. For example, a total length TTL of the imaging lens system may be within a range of 60 to 100 mm, a focal length f may be within a range of 12.0 to 16.0 mm, a focal length f1 of the first lens may be within a range of −18 mm or less, a focal length f2 of the second lens may be within a range of −20 mm or less, a focal length f3 of the third lens may be within a range of 30 to 50 mm, a focal length f4 of the fourth lens may be within a range of 17 to 30 mm, a focal length f5 of the fifth lens may be within a range of −30 to −10 mm, a focal length f6 of the sixth lens may be within a range of 15 to 40 mm, and a focal length of the seventh lens may be within a range of −20 mm or less.

Figure 13:
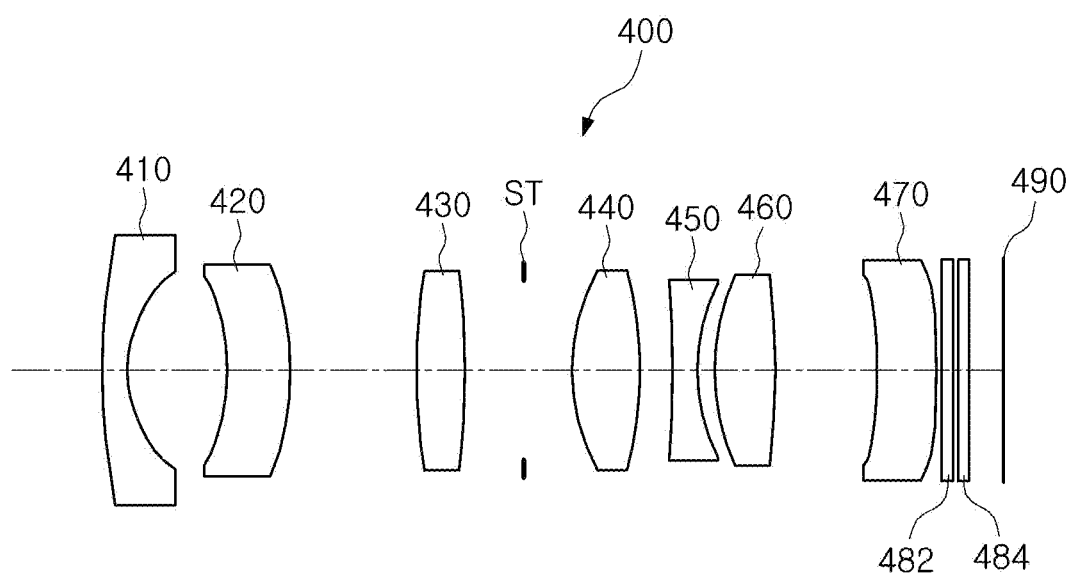
FIG. 13 is a diagram illustrating a fourth example of an imaging lens system.

FIG. 13 lists optical properties of the imaging lens system in accordance with the first example to the sixth example.

TABLE 13

| Note | First Example | Second Example | Third Example | Fourth Example | Fifth Example | Sixth Example |
|---|---|---|---|---|---|---|
| f1 | −22.583 | −22.935 | −60.605 | −21.505 | −21.558 | −19.245 |
| f2 | −139.896 | −109.963 | −25.371 | −207.282 | −204.707 | −134.125 |
| f3 | 39.421 | 38.686 | 39.424 | 45.278 | 43.086 | 32.756 |
| f4 | 25.940 | 26.014 | 27.339 | 25.393 | 25.042 | 19.421 |
| f5 | −18.599 | −18.686 | −19.986 | −21.454 | −21.324 | −20.495 |
| f6 | 25.104 | 24.653 | 24.406 | 31.594 | 31.599 | 21.550 |
| f7 | −100.433 | −90.051 | −130.420 | −431.523 | −255.117 | −35.358 |
| TTL | 91.243 | 92.100 | 99.987 | 89.987 | 89.989 | 70.006 |
| BFL | 6.588 | 6.588 | 6.590 | 6.588 | 6.589 | 6.006 |
| f | 14.257 | 14.268 | 14.236 | 14.189 | 14.186 | 14.110 |

Table 14 lists values of conditional equations of the imaging lens system in accordance with the first example to the sixth example.

TABLE 14

| Equation | First Example | Second Example | Third Example | Fourth Example | Fifth Example | Sixth Example |
|---|---|---|---|---|---|---|
| DTnT | −1.500 | −1.500 | −1.500 | −2.500 | −2.500 | 1.500 |
| DTnF | 11.100 | 11.100 | 11.100 | 11.200 | 11.200 | 11.200 |
| DTnR | −12.600 | −12.600 | −12.600 | −13.700 | −13.700 | −9.700 |
| |DTnF/DTnR| | 0.8810 | 0.8810 | 0.8810 | 0.8175 | 0.8175 | 1.1546 |
| CTE6 − CTE7 | 3.1000 | 3.1000 | 3.1000 | 3.7000 | 3.7000 | 1.4000 |
| 1/(f4*Vt4) | −0.0008 | −0.0008 | −0.0008 | −0.0008 | −0.0009 | −0.0011 |
| 1/(f5*Vt5) | 0.0007 | 0.0007 | 0.0006 | 0.0006 | 0.0006 | 0.0006 |
| 1/(f6*Vt6) | −0.0009 | −0.0009 | −0.0009 | −0.0007 | −0.0007 | −0.0007 |
| VT4 − VT3 | 246.4 | 246.4 | 246.4 | 237.8 | 237.8 | 242.8 |
| VT6 − VT7 | 615.1 | 615.1 | 615.1 | 358.2 | 358.2 | 824.1 |
| |(VT1 − VT2)/(VT6 − VT7)| | 0.0286 | 0.0286 | 0.0286 | 0.0491 | 0.0491 | 0.0147 |
| V4 − V5 | 58.80 | 58.80 | 58.80 | 58.80 | 58.80 | 48.92 |

According to the aforementioned examples, the imaging lens system which may implement constant optical properties at a high or low ambient temperature may be provided.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system, comprising:
a first lens, a second lens, a third lens, a fourth lens, a fifth lens comprising a concave object-side surface, a sixth lens comprising a convex image-side surface, and a seventh lens comprising a convex image-side surface disposed in order from an object side with a gap disposed along the optical axis between each set of adjacent lenses; and
a stop disposed on an image side of one of the first to sixth lenses, wherein one or more of the second to seventh lenses, disposed on an image side of the stop, each has a positive refractive power and a negative refractive index temperature coefficient.

2. The imaging lens system of claim 1, wherein the stop is disposed between the third lens and the fourth lens.

3. The imaging lens system of claim 1, wherein the fourth lens or the sixth lens has positive refractive power.

4. The imaging lens system of claim 3, wherein the fourth lens or the sixth lens has a negative refractive index temperature coefficient.

5. The imaging lens system of claim 1, wherein a refractive index temperature coefficient of the fourth lens or the sixth lens is greater than $-10*10^{-6}/°$ C. and less than $-0.5*10^{-6}/°$ C.

6. The imaging lens system of claim 1, wherein the second lens has a concave object-side surface.

7. The imaging lens system of claim 1, wherein the seventh lens has negative refractive power.

8. The imaging lens system of claim 1, wherein the seventh lens has a concave object-side surface.

9. An imaging lens system, comprising:
a first lens group disposed on an object-side surface of a stop; and
a second lens group disposed between the stop and an image-side surface,
wherein a sum, DTnT, of refractive index temperature coefficients of lenses included in the first lens group and lenses included in the second lens group is $-3.5$ $[10^{-6}/°$ C.] or greater and 3.5 $[10^{-6}/°$ C.] or less.

10. The imaging lens system of claim 9, wherein a sum, DTnF, of refractive index temperature coefficients of the lenses included in the first lens group is 5.0 $[10^{-6}/°$ C.] or greater and 15 $[10^{-6}/°$ C.] or less.

11. The imaging lens system of claim 9, wherein a sum, DTnR, of refractive index temperature coefficients of the lenses included in the second lens is $-20$ $[10^{-6}/°$ C.] or greater and $-8.0$ $[10^{-6}/°$ C.] or less.

12. The imaging lens system of claim 9, wherein the sum, DTnF, of refractive index temperature coefficients of the lenses included in the first lens group and the sum, DTnR, of refractive index temperature coefficients of the lenses included in the second lens group satisfy $0.8 \leq |DTnF/DTnR| \leq 1.2$.

13. The imaging lens system of claim 9, wherein, among the lenses included in the first lens group, a lens most adjacent to the stop has positive refractive power.

14. The imaging lens system of claim 9, wherein, among the lenses included in the second lens group, a lens most adjacent to the stop has positive refractive power.

15. The imaging lens system of claim 9, wherein, among the lenses included in the second lens group, a lens most adjacent to the image-side surface has negative refractive power.

16. The imaging lens system of claim 1, wherein the second lens has a convex image-side surface.

* * * * *